United States Patent [19]

Murakami et al.

[11] Patent Number: 4,608,651
[45] Date of Patent: Aug. 26, 1986

[54] CONTROL SYSTEM FOR DIRECT TEACHING/PLAYBACK TYPE ROBOTS

[75] Inventors: Tsudoi Murakami; Shoji Nasu; Yasuhide Nagahama, all of Kobe; Hironosuke Kada, Kanagawa; Teruyoshi Sekino, Kanagawa; Hirokazu Murayama, Kanagawa; Yoshiaki Munezane, Kanagawa; Goro Tuda, Kobe; Osamu Mizuguchi, Higashimachi, all of Japan

[73] Assignee: Kabushiki Kaisha Kobe Seiko Sho, Kobe, Japan

[21] Appl. No.: 499,880

[22] Filed: Jun. 1, 1983

[30] Foreign Application Priority Data

Oct. 28, 1982 [JP] Japan .................. 57-190092
Oct. 28, 1982 [JP] Japan ................ 57-164528[U]
Oct. 28, 1982 [JP] Japan .................. 57-190093
Nov. 9, 1982 [JP] Japan ................ 57-170694[U]
Nov. 26, 1982 [JP] Japan .................. 57-208092

[51] Int. Cl.$^4$ .............. G09C 00/00; G05B 19/18; B25J 11/00; F16D 21/04
[52] U.S. Cl. ................. 364/513; 364/477; 364/167; 318/568; 318/600; 901/15; 901/25; 192/0.052
[58] Field of Search ............ 364/513, 190, 192, 193, 364/167, 168, 169, 174, 175, 477; 318/630, 568, 628, 563, 646, 600, 601; 901/3, 5, 9, 14, 15, 25, 46, 48; 192/0.03, 0.052, 0.077

[56] References Cited

U.S. PATENT DOCUMENTS

| | | | |
|---|---|---|---|
| 3,668,498 | 6/1972 | Austin, Jr. ............... | 901/25 X |
| 3,774,097 | 11/1973 | Roy ........................ | 318/568 |
| 4,029,949 | 6/1977 | Dew ........................ | 364/167 |
| 4,179,035 | 12/1979 | Francois ................. | 901/15 X |
| 4,216,415 | 8/1980 | Shimonou ............... | 318/601 X |
| 4,258,425 | 3/1981 | Ramsey et al. ......... | 364/477 X |
| 4,379,987 | 4/1983 | Kohzai et al. .......... | 318/563 X |
| 4,434,881 | 3/1984 | Denk et al. ............ | 192/0.03 |
| 4,458,321 | 7/1984 | Whitney et al. ....... | 318/368 |
| 4,485,338 | 11/1984 | Matsuura ............... | 318/600 X |
| 4,529,072 | 7/1985 | Oguma et al. ......... | 192/0.052 |

*Primary Examiner*—Jerry Smith
*Assistant Examiner*—Jon D. Grossman
*Attorney, Agent, or Firm*—Oblon, Fisher, Spivak, McClelland & Maier

[57] ABSTRACT

A control system for a direct teaching/playback type robot, including a low spring constant member connected to a drive source for driving a robot element through a frictional coupling. The control system basically includes a first incremental position detector provided between the robot element and the frictional coupling for detecting the rotational position of the robot element, a second incremental position detector connected to the drive source for detecting the rotational position of the drive source, and a switch for selectively connecting the output terminals of the first and second position detectors to a drive source controller in teaching and playback modes of operation, respectively.

17 Claims, 43 Drawing Figures

FIGURE 29
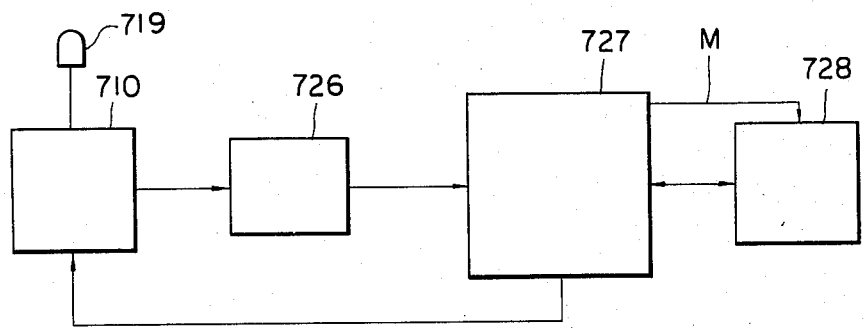
FIGURE 31
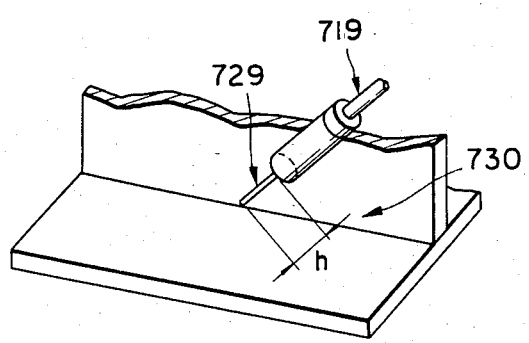
FIGURE 32
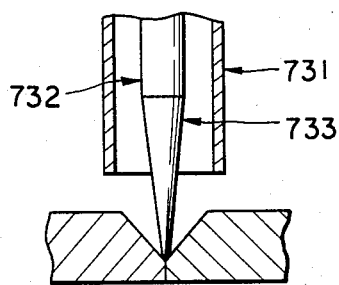
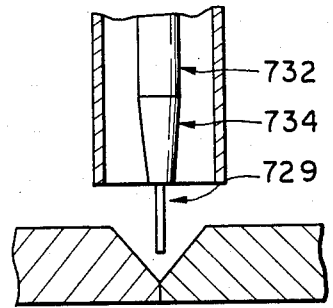

CONTROL SYSTEM FOR DIRECT TEACHING/PLAYBACK TYPE ROBOTS

BACKGROUND OF THE INVENTION

1. Field of the Invention

This invention relates to a control system for direct teaching robots, and more particularly to a direct teaching/playback robot control system which is adapted to eliminate operational instability and errors attributable to a reducer or other transmission components employed in the drive line of a robot or influences of external forces acting on the robot element.

2. Description of the Prior Art

In the case of a direct teaching type robot, there invariably arises the necessity for disconnecting and freeing the moving elements of the robot from the drive mechanism by a suitable means so that the wrist and arm portions of the robot can be moved lightly by an operator at the time of direct teaching operation when the drive source is stopped. For example, in an arrangement where a robot arm 1 is rotated by a motor M as shown in FIG. 1, a clutch 2 which is interposed between the arm 1 and motor M is released prior to direct teaching to free the arm 1 from the resistances of the motor M and a reducer 3. Further, it has been the conventional practice to detect the position of the arm 1 by a position detector, for example, by means of an encoder, which detects the arm position during the teaching and playback operations using a single position detector E1. Therefore, in most cases the position detector E1 is located on the side of the arm 1, more particularly, between the clutch 2 and arm 1.

However, as shown in FIG. 2 which illustrates in block diagram form the automatic control system of FIG. 1, the transfer function Gm of the motor is connected in series with the transfer function GL which corresponds to the deflections of the reducer and the drive shaft of the mechanical transmission system, so that the resulting transfer function corresponds to the product of these two transfer functions. Consequently, as the mechanical system becomes flexible and low in the intrinsic frequency of the transfer function GL, the control is destabilized by oscillation when the loop gain is raised.

For instance, a reducer generally referred to as the "Harmonic Drive" reducer (a trademark of Harmonic Drive Systems) which is free of backlashes and capable of establishing a high reduction ratio can be suitably applied to the rotational transmission system of a robot actuator for enhancing the arm positioning accuracy and reducing the size, but its small spring constant is reflected by a large torsion, giving rise to the problem of oscillation due to lowering of the intrinsic frequency of the transfer function. Examples of step response characteristics of the control system shown in FIG. 1 are plotted in FIGS. 3 and 4. FIG. 3 shows a case where the gain is low while FIG. 4 shows a case where the gain is slightly raised. As clear therefrom, the vibration is magnified with the lapse of time until the control becomes utterly difficult. The delay of response in such a control system is caused by a component part of low spring constant, not only by the use of the above-mentioned "Harmonic Drive" reducer but also by other planetary gear and cyclo type reducers, or by a transmission shaft which is too long or thin in diameter as compared with the load or by the compressibility of oil in the case of hydraulic power transmissions.

SUMMARY OF THE INVENTION

It is an object of the present invention to eliminate the delay of control of a direct teaching type robot, which inevitably occurs in the conventional control system employing a single position detector for detecting the arm position of the robot in both teaching and playback operations.

It is a more specific object of the present invention to provide a control system employing a couple of position detectors one on the output side and the other one on the input side of the transmission mechanism including a reducer and a frictional coupling means, feeding back the positional data of the output side to a drive control to eliminate the delays or errors caused by the torsional deformation of the transmission mechanism.

It is another object of the present invention to provide a control system of the sort mentioned above, further including protection means for protecting the robot element or the transmission mechanism upon application of an unduly large load.

It is a further object of the present invention to provide a control system of the sort mentioned above, further employing a switch or a switch box which is mounted on or in the vicinity of a robot element and readily accessible during direct PTP teaching operation of, for example, an industrial welding robot to send necessary instruction signals therethrough.

It is a still another object of the present invention to provide a control system of the sort mentioned above, further employing means for limiting the movement of a robot element to a software-controllable range in direct teaching operation.

These and other objects are achieved according to the present invention, by providing a novel control system for a direct teaching/playback type robot, having a low spring constant member connected to a drive source for driving a robot element through a frictional coupling, wherein the control system includes: a first incremental position detector provided between the robot element and the frictional coupling for detecting the rotational position of the robot element; a second incremental position detector connected to the drive source for detecting the rotational position of the drive source; and a switching circuit for selectively connecting the output terminals of the first and second position detectors to a drive control device in teaching and playback modes of operation, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 29 is a block diagram of a control system for the robot of FIG. 28;

FIGS. 31 and 32 are diagrammatic views showing the position of the distal end of the welding torch in teaching and playback operations;

DETAILED DESCRIPTION OF THE PREFERRED EMBODIMENTS

Figure 1:
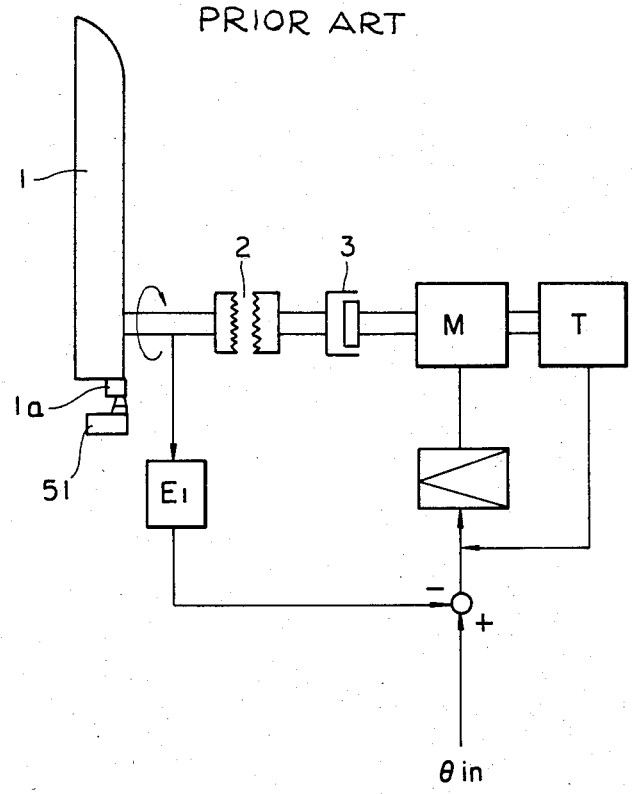
FIG. 1 is a block diagram of a conventional control circuit for a direct teaching type robot.
Figure 2:
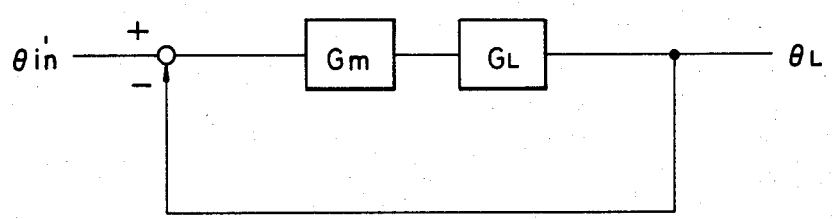
FIG. 2 is a block diagram showing a mathematical model of the same control circuit.
Figure 4:
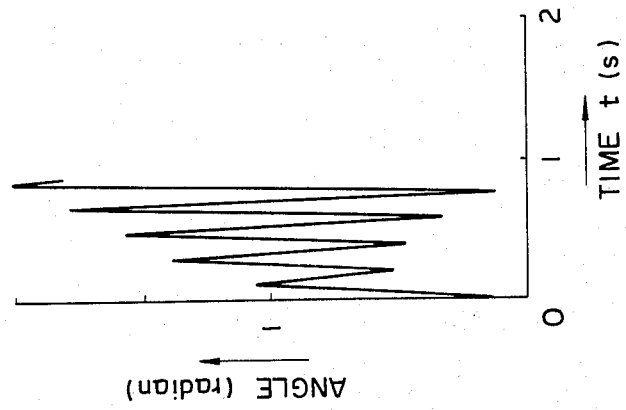
FIGS. 3 and 4 are graphs of the step response characteristics of the control circuit of FIG. 1.
Figure 3:
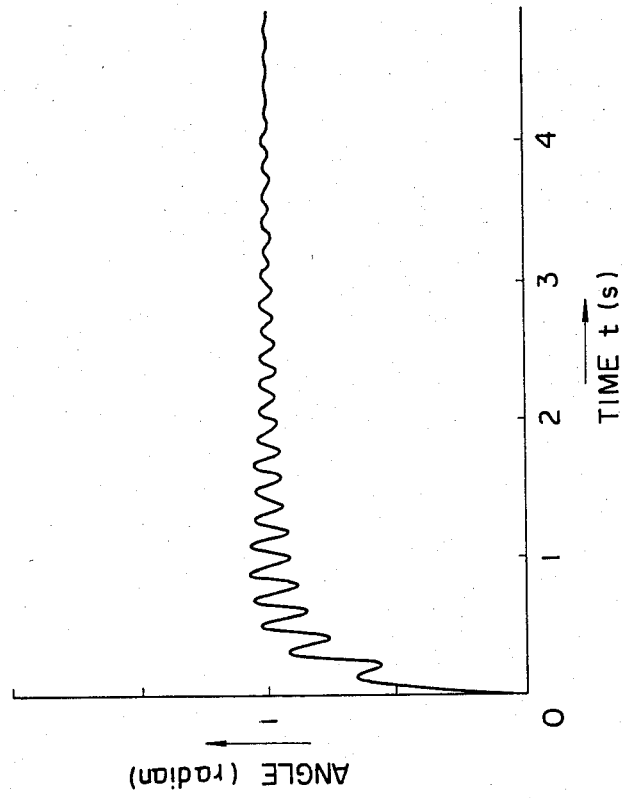
Figure 5:
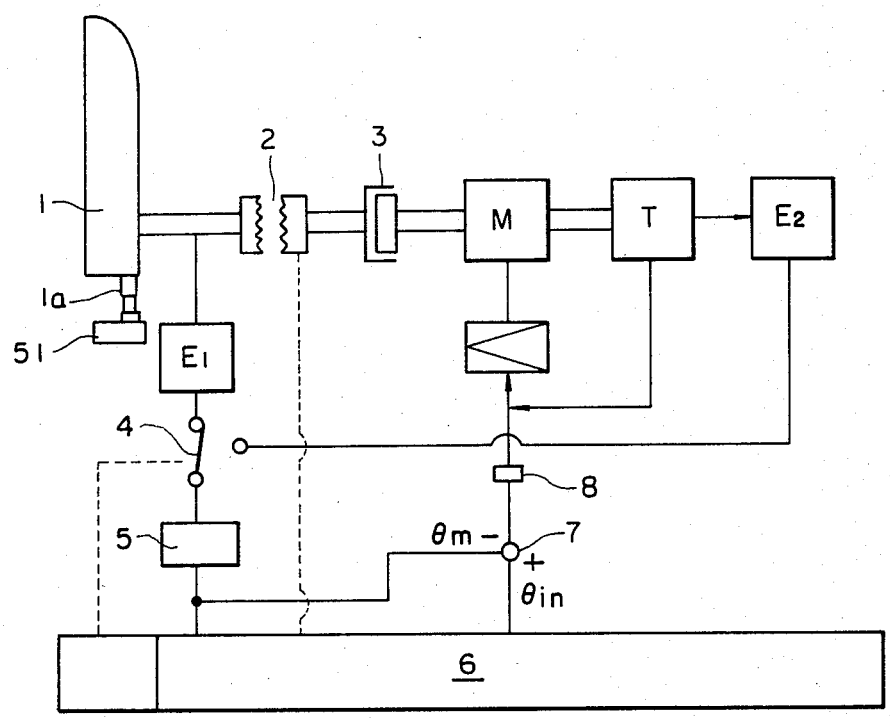
FIG. 5 is a block diagram of a control system embodying the present invention.
Figure 6:
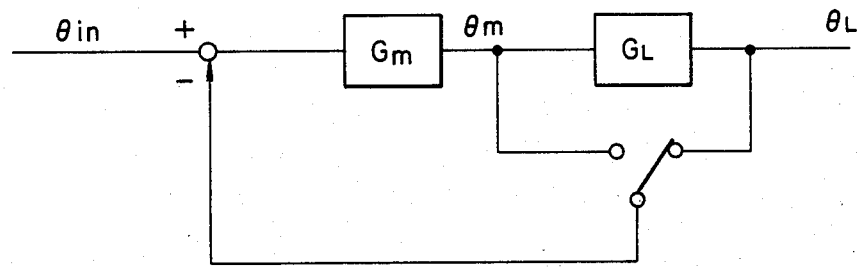
FIG. 6 is a block diagram showing a mathematical model of the control system of FIG. 5.

Referring now to the drawings, wherein like reference numerals designate identical or corresponding parts throughout the several views, and more particularly to FIGS. 5-8 thereof, denoted at 1 to 3 and M are a robot arm, a clutch, a reducer and a motor with a transfer function Gm, respectively. A first detector E1, for example, an incremental encoder which is directly mounted on the robot arm 1 to detect its rotational position. Detector E1 has an ouput terminal connected to a pulse counter 5 such as an up-down counter through a switch 4 to send an output signal from the counter 5 to a control unit 6 and a comparator 7. The comparator 7 is connected to the control circuit 6 to compare the signal of the rotational angle ($\theta$m) of the motor with the target signal ($\theta$in) of the arm position which is supplied from the control unit 6. Comparator 7 sends the difference between the two signals to the motor M after conversion into an analog quantity through a D/A converter 8. A second detector E2 is also constituted by an incremental encoder which detects the rotational angle of the motor from a tachogenerator T mounted on the motor M. Dectector E2 is connected to the pulse counter 5 through the switch 4. The control unit 6 which is constituted by a microcomputer is capable of controlling the operations of at least one of the selector switch 4, pulse counter 5 and comparator 7.

The above-described control system operates in the following manner in the teaching and playback modes. When the control system 6 is put in the teaching mode by a selector switch which is not shown, the control system 6 produces a signal to set the switch 4 in the position of FIG. 5 to connect the first detector E1 with the counter 5, and a signal to release the clutch 2. As the clutch 2 is released, the arm 1 can be manually rotated by an operator and its rotation is detected by the first incremental detector E1 by way of pulse signals. The incremental encoder of this sort is well known in the art. For example, in the case of a photoelectric type, there may be employed an encoder using a rotary disc with two rows of slits formed at predetermined intervals and with a phase lag of 90° from each other to discriminate the direction of rotation and adapted to produce a "O" signal for each revolution (hereinafter referred to as "Z-signal"). The up-down counter which is employed as the counter 5 for counting the output pulse signals of the detector E1 is also of a known construction, including an up-count input terminal, a down-count input terminal and a clear signal input terminal for resetting the count value into an initial state (all zero). More particularly, when a limit switch for the detection of the original point is turned on by an arm striker la at a predetermined arm angle representing the original point of the arm, the detector E1 produces a Z-signal and a signal of high level is applied to the clear input terminal. Therefore, the up-down counter 5 which integrates the up-and down-pulses from the first detector E1 produces an output signal indicating the absolute position of the arm 1. Such operation and construction of an incremental detector as well as its relation with the counter 5 is commonly applicable to both of the detectors E1 and E2. The output of this sort of incremental pulse encoder is in the form of uniformly spaced pulses which simply indicate an increment or decrement by way of a number of pulse signals and not the absolute position of the arm. The first and second incremental detectors E1 and E2 are adapted to produce the same number of pulses against rotation of a predetermined unit angle of the arm 1, so that there will occur no errors even if the connection of the counter 5 is switched from the first detector E1 to the second detector E2 or vice versa. It follows that the output of the counter 5 takes the same value no matter whether it is connected to the first detector E1 or the second detector E2. However, desirably the counter 5 is switched to the first or second detector by the switch 4 when the motor M is at a halt, in order to avoid the errors caused by the torsional deformation of the reducer or other components which occurs when in an accelerated state or when a load is imposed on the arm. In this regard, it is desired to provide a spring balancer or a counterweight for each robot arm or similar robot elements to offset the gravitational moment which acts on such elements even when the robot stands still. Further, for preventing such errors, it is also recommended to switch the detectors constantly at a predetermined position where the influence of the gravitational moment is most trivial.

Thus, in the teaching mode, the rotational angle of the arm position is measured by the counter 5 and the value resulting from a movement in a certain time period is sequentially stored in a memory of the control system 6. Of course, position detectors similar to the incremental encoder E1 are provided with regard to other degrees of freedom of the arm 1, storing in the memory the positional data in the respective directions of movement. The teaching is completed when all of the instructed positional data are loaded in the memory.

In the next place, the mode selector switch is set in the playback position, whereupon the clutch 2 is engaged and the switch 4 is changed into the other position to connect the counter 5 with the second detector E2. In the playback operation, the positional data of the arm 1 which are given by the teaching are sequentially read out from the memory as target values ($\theta$in) to be sent to the motor M for the control of the arm position. The rotation of the motor M is detected by the second detector E2 and its output pulses indicative of the increments or decrements are integrated by the counter 5. The comparator produces an output signal corresponding to the difference between the detected rotational angle ($\theta$m) of the motor M and the target signal ($\theta$in). This output signal controls the direction of rotation of the motor M so as to minimize the difference thereby to bring the arm 1 automatically into a rotational position of the target angle ($\theta$in).

In the foregoing embodiment, the first and second detectors E1 and E2 which are selectively connected to the counter 5 are constituted by incremental encoders as mentioned hereinbefore, so that it is necessary to determine the zero point of the robot element to be controlled. The zero point is determined by the Z-signal of the encoder, more specifically, the Z-signal of the first detector E1 which is mounted on the part of the robot arm. This is because the Z-signal of the second detector which is mounted on the part of the motor loses the positional relationship with the robot arm when the clutch is released.

Figure 7:
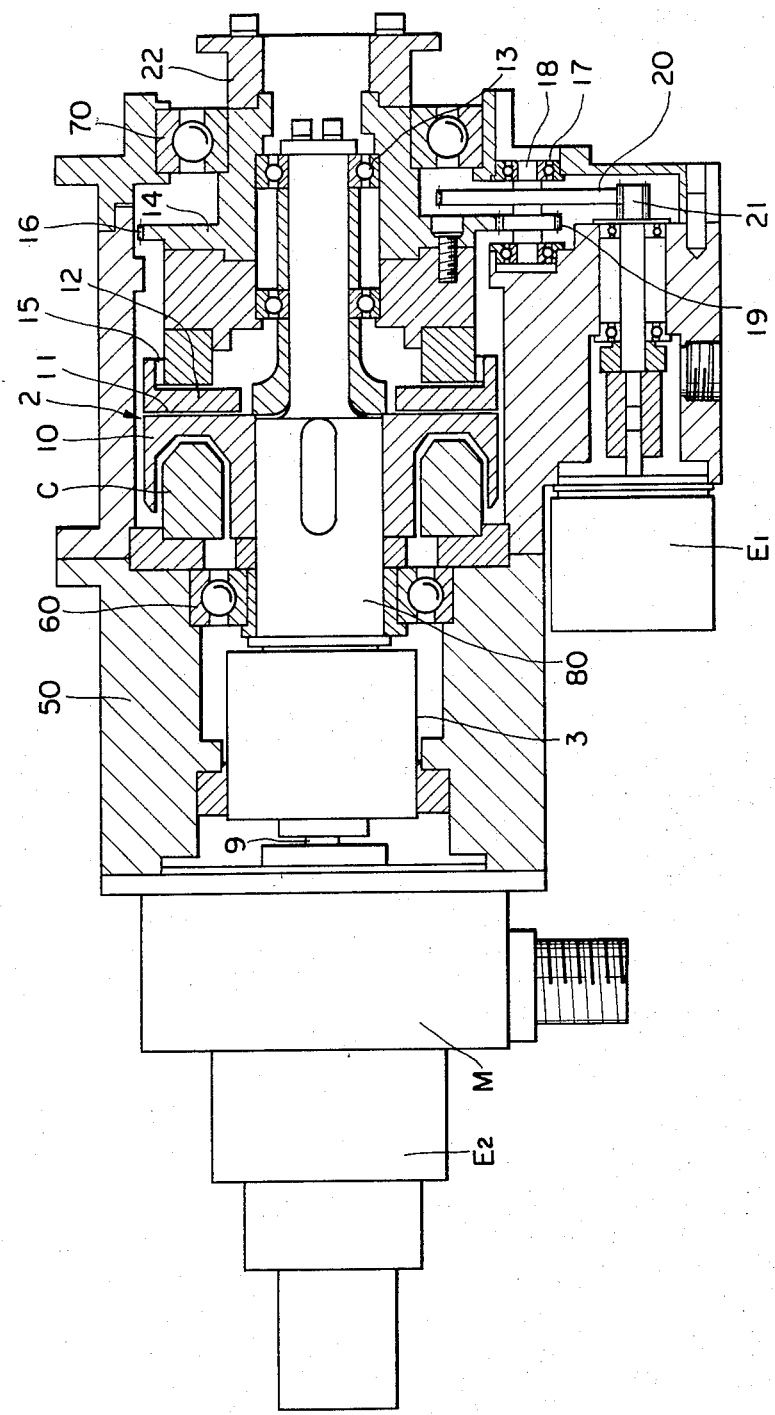
FIG. 7 is an axial cross-sectional view showing an example of robot actuator or drive mechanism incorporating the first and second position detectors shown in FIG. 6.
Figure 8:
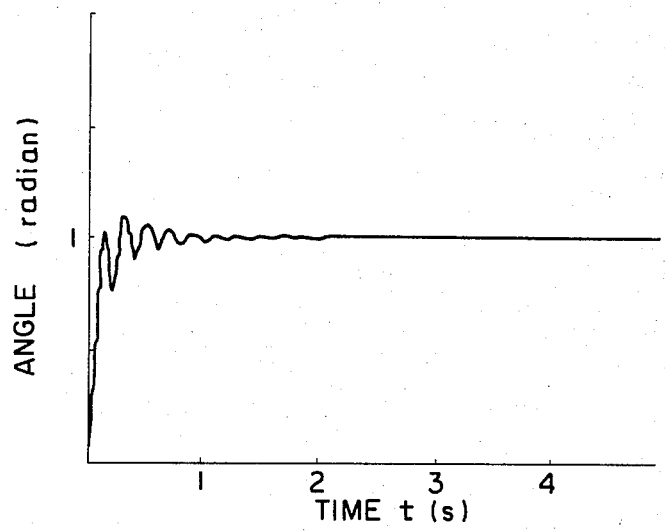
FIG. 8 is a graph of step response characteristics of the control system according to the invention.

FIG. 7 illustrates an example of a robot actuator or a drive mechanism incorporating the two detectors, wherein a motor M is attached to one end of a casing 50 which rotatably supports thereacross a shaft 80 through bearings 60 and 70, coupling the output shaft 9 of the motor M with the shaft 80 through a reducer 3. The shaft 80 is provided with a core 10 integrally in an intermediate portion of the shaft 10, the core 10 surrounding a coil C of an electromagnetic clutch 2. Disposed in small gap relation with the core 10 is a clutch disc 12 which is axially movably mounted by a spline 15 on a rotary cylinder 14 which is rotatably supported on the shaft 80 through a bearing 13. The rotary cylinder 14 is circumferentially provided with a large gear 16 for meshing engagement with a small gear 19 which is integrally formed on a shaft 18 which is in turn rotatably mounted on the casing 50 through a bearing 17. Further, a large gear 20 which is mounted on the shaft 18 is meshed with a small gear 21 which is connected to the first detector E1. A second detector E2 is mounted on the rear end of the output shaft 9 of the motor M. The afore-mentioned rotary cylinder 14 is provided with a joint portion 22 at its fore end for attaching a robot element thereto. Therefore, upon rotating the motor M, the number of its revolutions is detected by the second detector E2, and the rotation of the output shaft of the motor M is transmitted to the core 10 through the reducer 3 and, if the clutch is in on-state with the clutch disc 12 engaged with the core 10 by energization of the coil C, further transmitted to the first detector E1 through the rotary cylinder 14 and the train of gears 16, 19, 20 and 21, with the first detector E1 detecting the number of revolutions of the joint portion 22 of the clutch 2. In this instance, if the reduction ratio of the reducer 3 is 1/300 and the speed-up ratio of the gear train is 30, the first detector E1 is adapted to produce ten times as many pulses per revolution as compared with the second detector E2 thereby to equalize the numbers of output pulses per revolution of the two detectors. For this purpose, there may be employed a frequency divider or other suitable pulse equalizing means.

Figure 9:
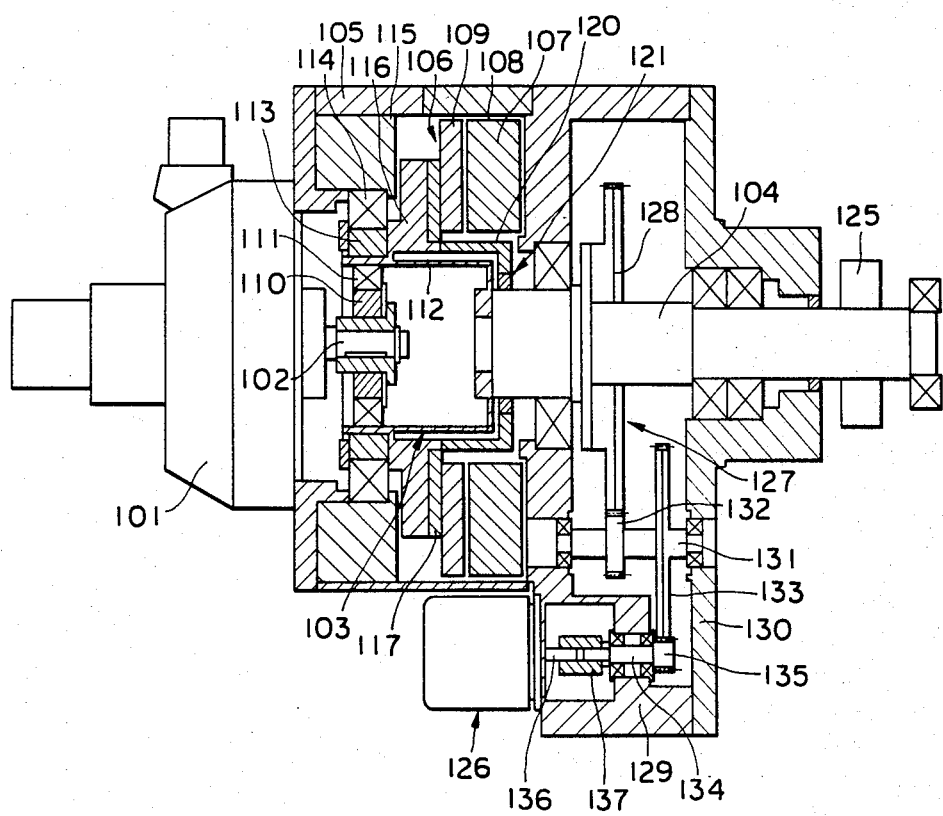
FIG. 9 is a view similar to FIG. 7 but showing a modification of the drive mechanism employing an electromagnetic brake in place of an electromagnetic clutch.

Shown in FIG. 9 is another example of the actuator construction, employing a brake mechanism which is releasably engageable with the reducer of the actuator. More specifically, indicated at 101 of FIG. 9 is an electric motor serving as a rotary drive source, at 102 an output shaft of the motor, at 103 a harmonic reducer coupled with the motor output shaft 102, and at 104 a robot arm drive shaft coupled with the harmonic reducer 103 and disposed coaxially with and opposingly to the output shaft 102 of the motor 101.

Provided in the housing 105 of the harmonic reducer 103 is a dry type brake mechanism, more particularly, an electromagnetic brake 106 which is releasably engageable with the harmonic reducer 103 and which is constituted by a stationary rotor 108 including a coil 107 and a rotatable armature 109 disposed vis a vis to the rotor 108.

The harmonic reducer 103 is of a conventional construction including an elliptic web generator plate 110 mounted on the motor output shaft through a boss, a bearing 111, a cup-like flex spline 112 provided around the outer periphery of the bearing 111, and a circular spline 113 meshed with the elliptic flex spline 112 in the longitudinal direction. The circular spline 113 is rotatably supported by the housing 105 through a bearing 114. A cylindrical member 116 with a flange portion 115 is securely fixed to the circular spline 113, with the flange portion 115 fixedly secured to the armature 109. Therefore, the armature 109 is rotatable integrally with the circular spline 113.

Upon de-actuating the electromagnetic brake 106 by deenergizing the coil 107, the armature 109 is disengaged from the rotor 108 to permit rotation of the circular spline 113. On the other hand, if the electromagnetic brake 106 is actuated, the armature is attracted and fixed by the rotor 108. As the electromagnetic brake 106 forcibly holds the circular spline 113 against rotation in this manner, the rotation of the output shaft 102 of the motor 101 is reduced through the harmonic reducer 103 and transmitted to the arm drive shaft 104 through the flex spline 112.

Figure 10:
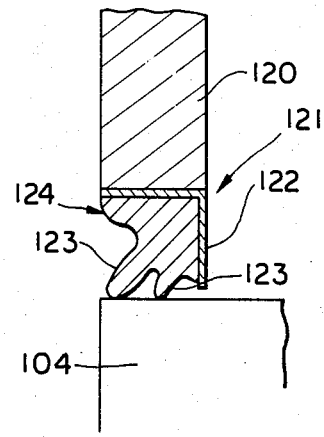
FIG. 10 is a fragmentary cross-sectional view showing on an enlarged scale the oil seal employed in the actuator of FIG. 9.

Preferably, the actuator is provided with a cover member 120 which spatially separates the harmonic reducer 103 and electromagnetic brake 106 from each other. The cover member 120 is securely fixed at one end to the end face of the cylindrical member 116 and provided at the other end with an oil seal 121 to cover the other end portion of the flex spline 112. The oil seal 121 is resiliently pressed on the circumferential surface of the arm drive shaft 104. As more particularly shown in FIG. 10, the oil seal 121 includes an outer ring of L-shape in section provided around the end face of the cover member 120 and a rubber member 124 fitted in the outer ring and having a number of radially extending fins thereby to seal off the grease or other oil which otherwise tends to creep onto the arm drive shaft 104.

With the foregoing arrangement, the grease or other lubricant oil which is applied on the outer periphery of the flex spline 112 is kept from entering the electromagnetic brake 106 to prevent slipping of the brake 106. The bearing 114 is provided with a seal so that there is no possibility of the lubricant oil intruding into the electromagnetic brake 106.

Preferably, a rotational transmission 127 is provided between the harmonic reducer 103 and the robot arm (or an link connected to the robot arm) for transmitting rotation to a position detector 126. As shown in FIG. 9, the transmission 126 includes a gear train including a large-diameter gear 128 which is mounted on the arm drive shaft 104, a small-diameter gear 132 and a medium-diameter gear 133 which are mounted on a shaft 131 supported between housing walls 129 and 130, and a gear 135 which is mounted at the end of a shaft 134 extending through a housing wall 129. The position detector 126 which detects the rotational angle of the robot arm drive shaft 104 is fixedly supported on the housing wall 129 and has a rotational shaft 36 connected to the shaft 134 through a coupling 137. The transmission 126 may include a combination of a chain and a sprocket or a pulley and a belt. Alternatively, the gear train 127 and the position detector 126 may be provided on opposite sides of the arm 125 at the end away from the harmonic reducer 103, particularly when the space is limited. Nevertheless, the embodiment of FIG. 9 has the advantage that the drive section can be arranged in a compact form.

In operation, more particularly, in the teaching operation, the electromagnetic brake 106 is de-actuated, disengaging the armature 109 from the rotor 8 to permit rotation of the circular spline 113. In this state, the arm 125 is manually moved according to the contents of teaching, whereupon, since the circular spline 113 is now freely rotatable, the flex spline 112 is rotated about the circumference of the bearing 111 together with the circular spline 113 through the arm drive shaft 104. Thus, the arm 125 can be operated with an extremely light force.

The rotation of the drive shaft 104 in the teaching operation is transmitted to the position detector 126 through the gear train 127 for the detection of the arm position. The data of the detected position are stored in a memory device for use in the playback operation.

With the above-described fundamental embodiment of the present invention, a small phase difference between the output pulses of the first detector on the part of the robot element and the second detector on the part of the drive source would not lead to any material error as long as the detectors are switched only once by the switching means. However, in a case where the detectors are switched for a number of times, there is a possibility of the errors being accumulated into an unignorable amount. In order to eliminate this problem, FIG. 11 illustrates another embodiment of the present invention, which employs absolute type detectors for the control system of a direct teaching type robot.

Figure 11:
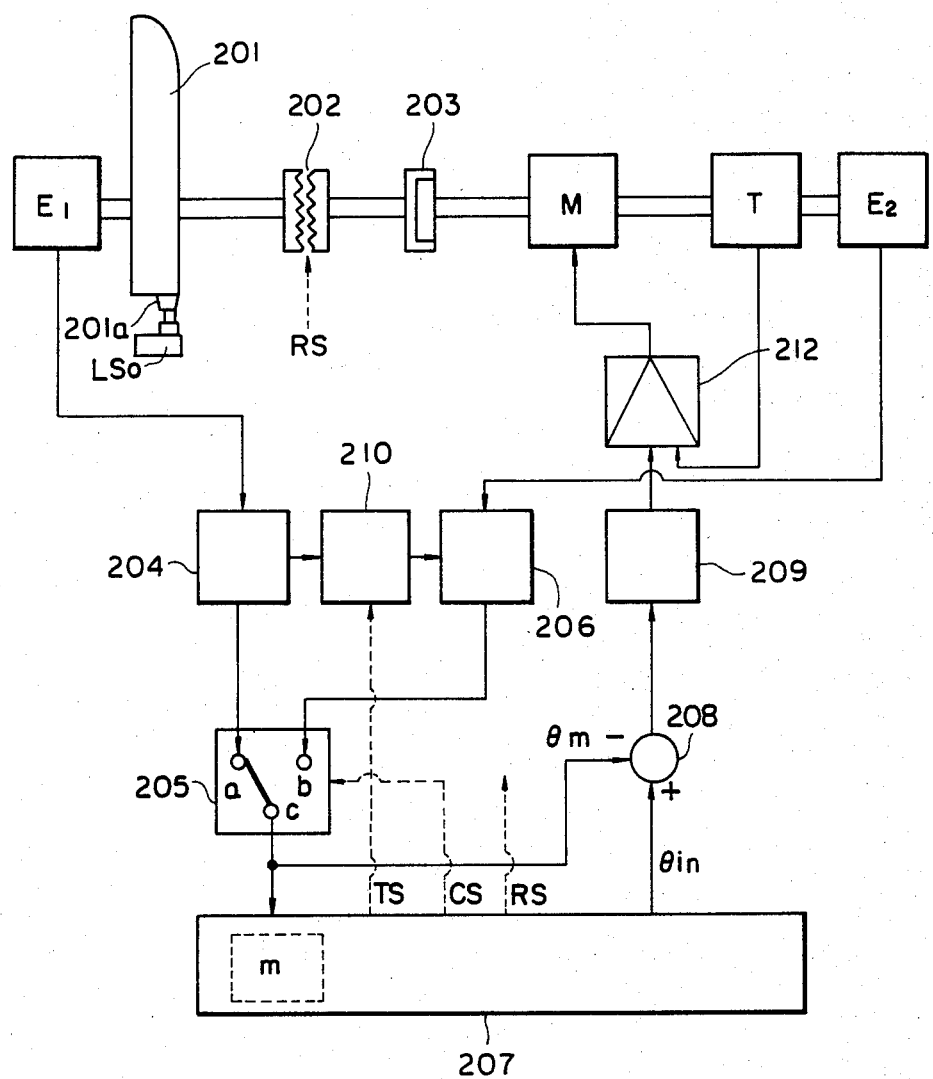
FIG. 11 is a block diagram showing another embodiment of the present invention.

In the block diagram of FIG. 11, indicated at 201 to 203 and M are a robot arm, a clutch, a reducer and a motor, respectively. A first detector E1 which is directly mounted on the robot arm 201 similarly to the foregoing embodiment is constituted by an incremental pulse encoder which is adapted to detect the rotational position of the robot arm 201, with the output shaft of the first detector E1 connected to one switching terminal a of a switch circuit 205 through a first pulse counter 204 which is constituted, for example, by an up-down counter. A second detector E2 which is likewise constituted by an incremental pulse encoder is mounted on the motor M for detecting its rotational angle, and connected to the other switching terminal b of the switch circuit 205 through a second pulse counter 206, for example, also in the form of an up-down counter. A common terminal c of the switch circuit 205 is connected to a control circuit 207 and at the same time to one input terminal of a comparator 208. The other input terminal of the comparator 208 is connected to the control circuit 207 to receive therefrom an instruction signal ($\theta$in) indicative of the target position of the arm 201, for comparison with the signal ($\theta$m) of the rotational position of the motor M which is fed through the switching terminal b and common terminal c of the switch circuit 205. The resulting difference of the two signals is converted into an analog quantity through a D/A converter 209 and applied to the motor M after amplification in an amplifier 212. In FIG. 11, the reference character T denotes a tachogenerator which detects the speed of the motor M for feedback to the aforementioned amplifier 212. The content value of the first pulse counter 204 is transferable to the second pulse counter 206 through a transfer circuit 210. The changeover action of the switch circuit 205 and the transfer action of the transfer circuit 210 are triggered by a change-over signal CS and a transfer signal TS from the control circuit 207, respectively. In this instance, the control circuit 207 is constituted by a microcomputer. Although the switch circuit 205, pulse counters 204 and 206, comparator 208, and transfer circuit 210 are provided externally of the control circuit 207 or the microcomputer, the functions of these circuits may be realized by the use of the internal processing ability of the microcomputer.

When the operation of the control circuit 207 is put in the teaching mode by manipulation of a mode selector switch which is not shown, the common terminal c of the switch circuit 205 is connected to the switching terminal a in response to a change-over signal (e.g., a signal of "0") from the control circuit 207, while the clutch 202 is released in response to the clutch-off signal Rs from the control circuit 207. In this state, the arm 201 can be manually turned by an operator, and the amount of its rotational movement is detected by way of the pulse signals produced by the incremental pulse encoder of the known construction as mentioned hereinbefore. Consequently, the rotational angle of the arm 201 is measured by the pulse counter 204 and fed as positional data to the control circuit 207 through the switch circuit 205, sequentially storing the positional data in the memory m of the control circuit 207 at predetermined time intervals to read in the arm movements for each degree of freedom in the same manner as in the foregoing embodiment.

In order to change the operation into the playback mode after completion of teaching, the mode selector switch of the control circuit 207 is turned to the playback position, whereupon a clutch-on signal RS "1" is produced by the control circuit 207 to engage the clutch 202. In the next phase, the control circuit 207 produces a transfer signal TS which actuates the transfer circuit 210 to transfer the contents of the first pulse counter 204, namely, the data of the current position of the arm 201 to the second pulse counter 206, setting the transferred data as an initial value of the second pulse counter 206. Therefore, the second pulse encoder 206 carries the same count value as the first pulse counter 204. In the next phase, the control circuit 207 produces a change-over signal CS "1" to connect the common terminal c of the switch circuit 205 to the switching terminal b. As a result of this switching action, the second pulse encoder 206 is now connected to the control circuit 207 through the switch circuit 205.

In the playback operation, the positional data of the arm 201 which have been obtained by teaching are sequentially read out from the memory m and supplied to the comparator 208 as the positional target values ($\theta$in). On the other hand, the second pulse counter 206 the initial value of which has been set by the positional signal of the first pulse counter 204 integrates the incremental or decremental pulses from the second pulse encoder E2 which detects the rotation of the motor M, supplying the output value $\theta$m of the second pulse counter 206 to the comparator 208 in which the detected rotational angle $\theta$m of the motor is compared with the target signal $\theta$in. According to the difference between the detected rotational angle $\theta$m of the motor and the target signal $\theta$in, the motor M is rotated in either direction to control the rotational position of the arm 201 automatically into equalization with the target angle $\theta$in.

At the time of switching the operation to the teaching mode from the playback mode, there is no need for transferring the output count value of the second pulse counter 206 to the first pulse counter 204 since the counting operation of the latter is continued even in the playback mode although not used.

Figure 12:
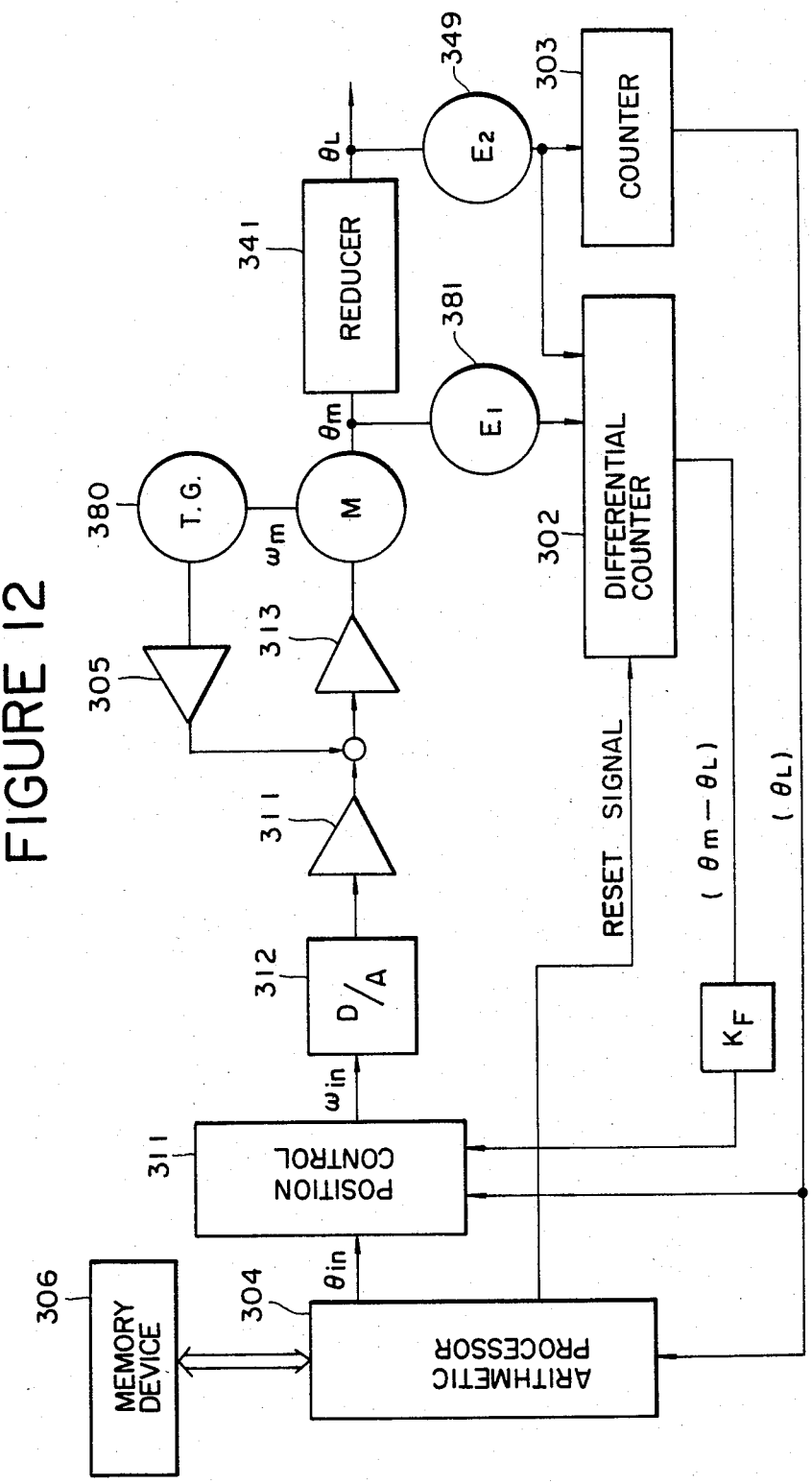
FIG. 12 is a view similar to FIG. 11 but showing a further embodiment of the present invention.

Referring to FIG. 12, there is illustrated a further embodiment of the invention, employing a feedback means from the detector on the part of the drive source in addition to the feedback means from the detector on the part of the robot element. With the control system shown in the block diagram of FIG. 12, the value of the target position data $\theta$in from an arithmetic processor 304 which is likewise constituted by a microcomputer is fed to a position control circuit 311 along with the output value of a counter 303 indicative of the position of the arm or other robot element. The position control circuit 311 producing a speed control signal $\omega$in by multiplying the difference ($\theta$in$-\theta_L$) between the two input signals $\theta$in and $\theta_L$ by a suitable gain $K_1$. The speed control signal $\omega$in is converted into an anolog quantity by a D/A converter and, after amplification at amplifiers 311 and 313, applied to the motor M to control its rotation which is transmitted to a robot element through a reducer 341 to provide an ordinary proportional control system. The number of revolutions $\omega$m of the motor which is detected by a tachogenerator 380 and is multiplied by a predetermined value at the amplifier 305 and fed back to the input terminal of a motor driver circuit 313 which is an amplifier. In a case where the position detector E2 is an incremental pulse encoder, it is necessary to provide an integration counter 303 to calculate the absolute value of the rotational angle of the arm, and in this case the position detector E2 corresponds to the first position detector in the foregoing embodiments.

In addition to the position detector E2, an incremental pulse encoder is provided on the side of the motor M to serve as a position detector E1 in the same manner as in the foregoing embodiments, feeding the output pulse signals of the first and second detectors E2 and E1 to a differential counter 302 serving as a conversion means for counting simultaneously the output pulse signals of the first and second detectors and the difference between the respective count values. Although incremental pulse encoders are used as the first and second position detectors, there may be employed the absolute type pulse encoders if desired. In such a case, the counter 303 can be omitted, and the differential counter 302 is simply required to calculate the difference between the output values of the two position detectors. In the embodiment shown in FIG. 12, the differential counter 302 feeds back the differential data ($\theta$m$-\theta_L$) of the positions $\theta$m and $\theta_L$ to the position control circuit 301, similarly to the positional data $\theta_L$ of the robot element. If desired, the position control circuit 311 may be arranged into part of the arithmetic processor 304. At the position control circuit 311, the two signals are added and the resulting positional data $\theta_L'$ is compared with the teaching positional data $\theta$in from the arithmetic processor 304. In this connection, it is to be noted that, when the differential data ($\theta$m$-\theta_L$) and the positional data $\theta_L$ is simply added, the sum $\theta_L'$ equals to the value of $\theta$m. Therefore, even through the value of $\theta_L$ is used as positional data, apparently the control uses the value of $\theta$m as a main feedback amount, which eliminates from the control loop influences of the vibrations and torsions of the mechanical system, mainly of the transmission like the reducer. Besides, it is possible to enhance the performance quality of the control further by multiplying the differential data ($\theta$m$-\theta_L$) by a suitable value $K_F(K_F>1)$ before addition to $\theta_L$, as will be explained in greater detail hereinlater.

There is no correlation between the data $\theta$m and $\theta_L$ as long as the clutch 351 is in off state as in the teaching mode, so that they show different values at the point in time when the clutch is re-engaged by a switch to start the playback mode. Therefore, it becomes difficult to measure the value ($\theta m - \theta L$) correctly during the playback operation unless the differential counter 302 is reset simultaneously with the engagement of the clutch 351. Once the differential counter 302 is reset to initialize the difference between $\theta m$ and $\theta L$, the value of ($\theta m - \theta L$) indicates the torsions and vibrations of the reducer 341 and other transmission components which take place afterwards. Desirably, a reset signal is produced at a time point prior to initiation of the playback operation, strictly at a time point immediately before an initial playback action. This is because the values of $\theta m$ and $\theta L$ already do not correspond to each other when in an accelerated state due to torsion of the reducer 341. Instead of completely initializing the value of the differential counter 302 by the resetting operation just described, a similar effect can be obtained by storing in a memory the difference at the end of the teaching operation or at the start of the playback operation as an initial deviation and subtracting it from the positional data which is fed from the differential counter 302 during the playback operation to determine the true positional data to be sent to the position control circuit. In a case where absolute type encoders are used for the first and second position detectors, the second position detector E1 is reset by transferring the contents of the first position detector E2 prior to the start of the playback operation in the manner as described hereinbefore.

In the teaching mode, the clutch 251 is released, and the robot element is moved by manual operation, while the position of the robot element is sequentially detected by the position detector E2 and counter 323 and the detected values are stored in the memory device 306 as teaching positional data. The stored teaching data are sequentially read out in the playback operation as teaching data $\theta in$ to calculate the difference between the teaching data $\theta in$ and the value synthesized from the position signal $\theta L$ from the counter 303 and the positional data from the differential counter 302, multiplying the resulting value by a suitable gain $K_1$ to produce a speed control signal $\omega in$ to be applied to the drive system.

Figure 13:
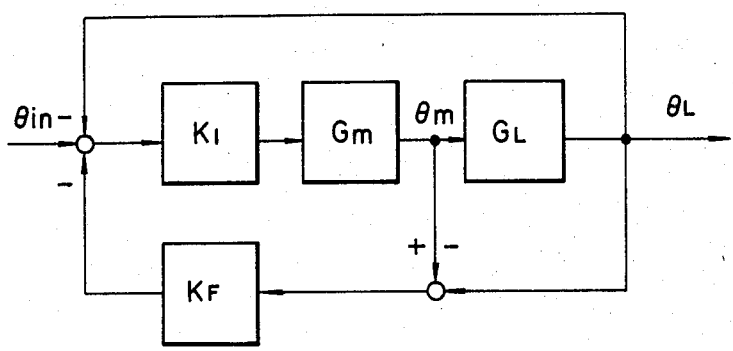
FIGS. 13 and 14 are block diagrams showing mathematical models of the control system of FIG. 12.
Figure 14:
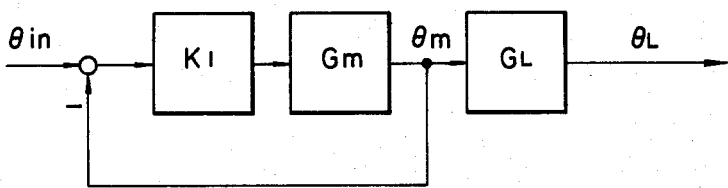

FIG. 13 illustrates in block diagram the operation of the above-described control system, in which the influence of the deflection of the reducer or other transmission components is omitted for the simplicity of explanation. When the value of $K_F$ is 1 in the control system of FIG. 12, it becomes equivalent to the control loop shown in the block diagram of FIG. 14. It will be understood therefrom that the characteristics of control of the direct teaching type robot can be improved to a degree comparable to that of the remote control type robot.

The cases where the value of $K_F$ is greater than 1 are hereafter explained by way of the Laplace transformation of the equation of the transfer function. Firstly, the transfer function of the mechanical system, which is indicated by $G_L$ in FIG. 7, involves a secondary delay and is expressed by $$G_L = \frac{1}{(J_L/K)S^2 + (D/K)S + 1} \quad (1)$$

in which $J_L$ is the inertia of the arm or other robot element, K is the spring constant of the reducer or the like, and D is the total viscous resistance including the viscosity of the oil or grease in the reducer and the pneumatic resistance of the arm or the like. In this connection, it is to be noted that the value of the coefficient D/K of the term S is notably larger than the coefficient $J_L/K$ of the term $S^2$ in the robots in general. This implies that the transfer coefficient $G_L$ is very susceptible to vibrations. On the other hand, the transfer function Gm of the motor is expressed by $$Gm = \frac{Km}{S(TmS + 1)}$$

Here, for the simplicity of explanation, it is assumed that Km is contained in $K_1$ and that the mechanical time constant Tm can be minimized approximately to zero by the use of a servo motor with good characteristics and the speed feedback by a tachogenerator, regarding the transfer coefficient Gm as $$Gm = \frac{1}{S} \quad (2)$$

Figure 16:
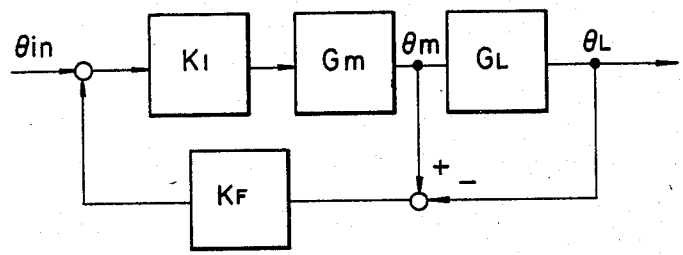
FIGS. 16 and 17 are block diagrams of control loops without the feedback of position data of FIG. 13.
Figure 17:
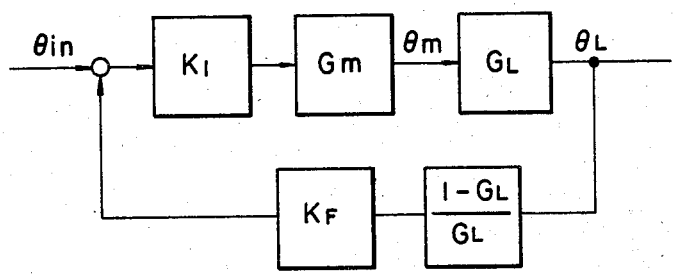

FIG. 17 illustrates a control loop without the positional feedback of FIG. 13, namely, a variation of the example shown in FIG. 16. The whole transfer function G is expressed by $$G = \frac{K_1 \cdot Gm \cdot G_L}{1 + Gm \cdot G_L \cdot K_1 \cdot K_F \left(\frac{1 - G_L}{G_L}\right)}$$

and, substituting Eqs. (1) and (2) thereinto, by $$G = \frac{K_1}{K_1 \cdot K_F \cdot D/K + 1} \cdot \frac{1}{S} \cdot \quad (3)$$

$$\frac{\frac{J_L}{K\left(\frac{K_1 \cdot K_F \cdot D}{K} + 1\right)} \cdot S^2 + \frac{\frac{D}{K} + \frac{K_1 \cdot K_F \cdot J_L}{K}}{\frac{K_1 \cdot K_F \cdot D}{K} + 1} S + 1}$$

From Eq.(3), it is known that $G_L$ in this case is $$\frac{1}{\frac{J_L}{K\left(\frac{K_1 \cdot K_F \cdot D}{K} + 1\right)} S^2 + \frac{\frac{D}{K} + \frac{K_1 \cdot K_F \cdot J_L}{K}}{\frac{K_1 \cdot K_F \cdot D}{K} + 1} S + 1}$$

which is an improved $G_L$ and designated by $G_L'$. The improved transfer function $G_L'$ is also of a secondary delay but its intrinsic frequency of vibration $\omega n'$ and coefficient of viscous resistance are respectively expressed by $$\omega n' = \frac{K}{J_L} \cdot K_1 \cdot K_F \frac{D}{K} + 1 = \frac{K}{J_L} \quad (4)$$

and $$\tau = \frac{D + K_1 \cdot K_F \cdot J_L}{2K \cdot J_L \cdot \frac{K_1 \cdot K_F \cdot D}{K} + 1} = \frac{D + K_1 \cdot K_F \cdot J_L}{2 K \cdot J_L} \quad (5)$$

The original values of $\omega n$ and $\tau$ of $G_L$ are $$\omega_n = \frac{K}{J_L} \quad (6)$$

-continued and $$\tau = \frac{D}{2K \cdot J_L} \quad (7)$$

so that, if D is considered to be approximately zero, the value of $\tau$ is zero in contrast to $\tau'$ which can be increased by $K_1 \cdot K_F$. Therefore, it is possible to set $\tau$ at a desired value by suitably selecting the value of $K_1 \cdot K_F$, for example, at the value of about 0.7 which is considered to be suitable in the servo mechanism in general. If the value of D is small enough, there will not occur large changes in the intrinsic frequency of vibration.

Figure 15:
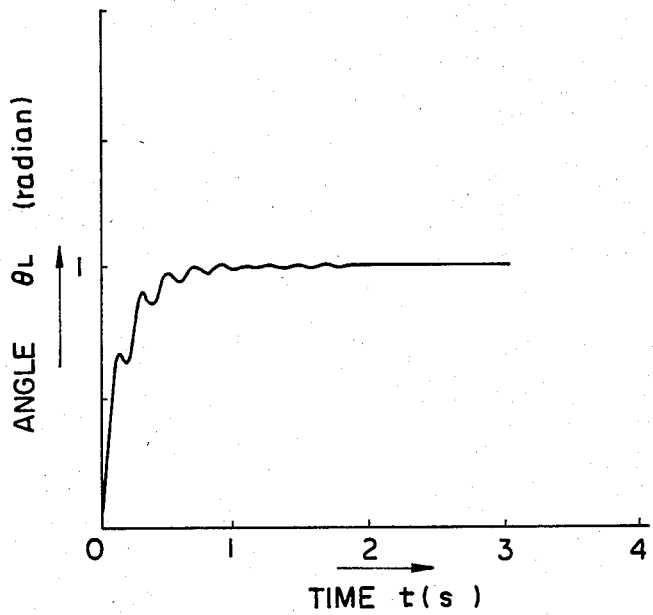
FIG. 15 is a graph showing step response characteristics of the control system of FIG. 11 in a case where $K=1$.
Figure 18:
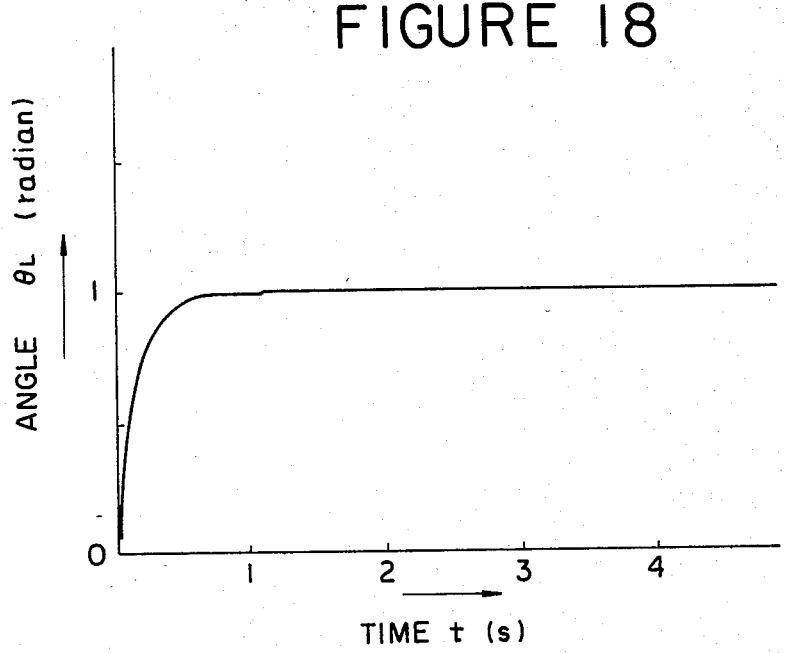
FIG. 18 is a graph showing step response characteristics in a case where $K>1$.

FIG. 18 shows the foregoing results by way of stepped response characteristics with regard to a case where $K_F > 1$. It will be understood that the control characteristics are further improved in comparison with the stepped response characteristics of FIG. 15 where $K_F = 1$. This is because the increase of $\tau$ or the viscous resistance coefficient and the values relative to the damping action by $K_F$ and $K_1$ have an effect similar to that of a damper which is mounted on the robot arm for attenuation of its vibration.

Although not considered in the foregoing transformation of equations of the transfer function, the deformation of the reducer or other components of the mechanical system by gravitational moment have actually a great influence. For example, speaking from the standpoint of the equation, the deformation (torsion) of the mechanical system takes place at the time of acceleration. Though it is arranged to suppress the output signal to the motor on occurrence of such deformation, there is still a possibility of the gravitational moment which acts on an actual robot causing deformation of the mechanical system even when the robot arm is at rest, deceiving the control system as if it is in acceleration. The problem of this sort can be eliminated by providing a gravitational balancing device which offsets the gravitational moment which would cause deformation of the mechanical system when the arm is at a stop. Namely, if $K_F > 1$ in the absence of the gravitational balancer, a magnified error due to deformation of the mechanical system is applied to the control loop, so that the mechanical system is controlled as if it is in acceleration, imposing an adverse effect on the control of the positioning operation. However, the gravitational balancing can theoretically preclude the error of this sort in addition to providing the improvement of accuracy in the stopped state.

Figure 19:
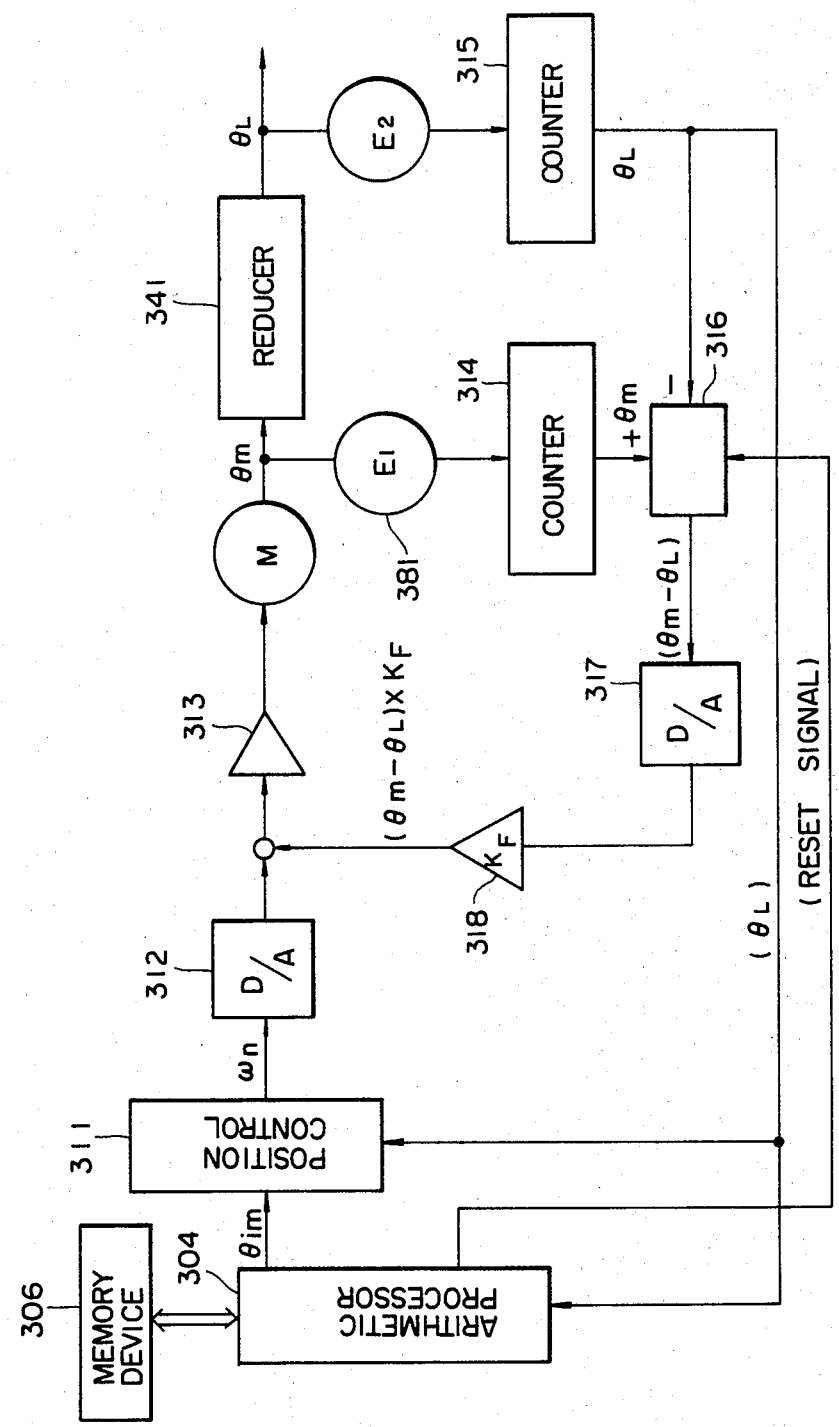
FIG. 19 is a block diagram of a modification of the control system of FIG. 12.

FIG. 19 illustrates a modification of the control system shown in FIG. 12, adding some changes to the position detection circuit. More particularly, in this modification, pulse counters 314 and 315 are provided for the position detectors E1 and E2, respectively, in combination with a subtractor 316 serving as conversion means for calculating the differential positional data between the two pulse counters 314 and 315. The differential position data is converted into an analog quantity at a D/A converter 317 and fed back to the input terminal of the motor drive circuit 313 through an amplifier 318 with a gain $K_F$. Therefore, it gives the same results as in the embodiment shown in FIG. 12, but in this case the value $K_F$ may be different from that of FIG. 12 depending upon the gain of the position control circuit.

Figure 20:
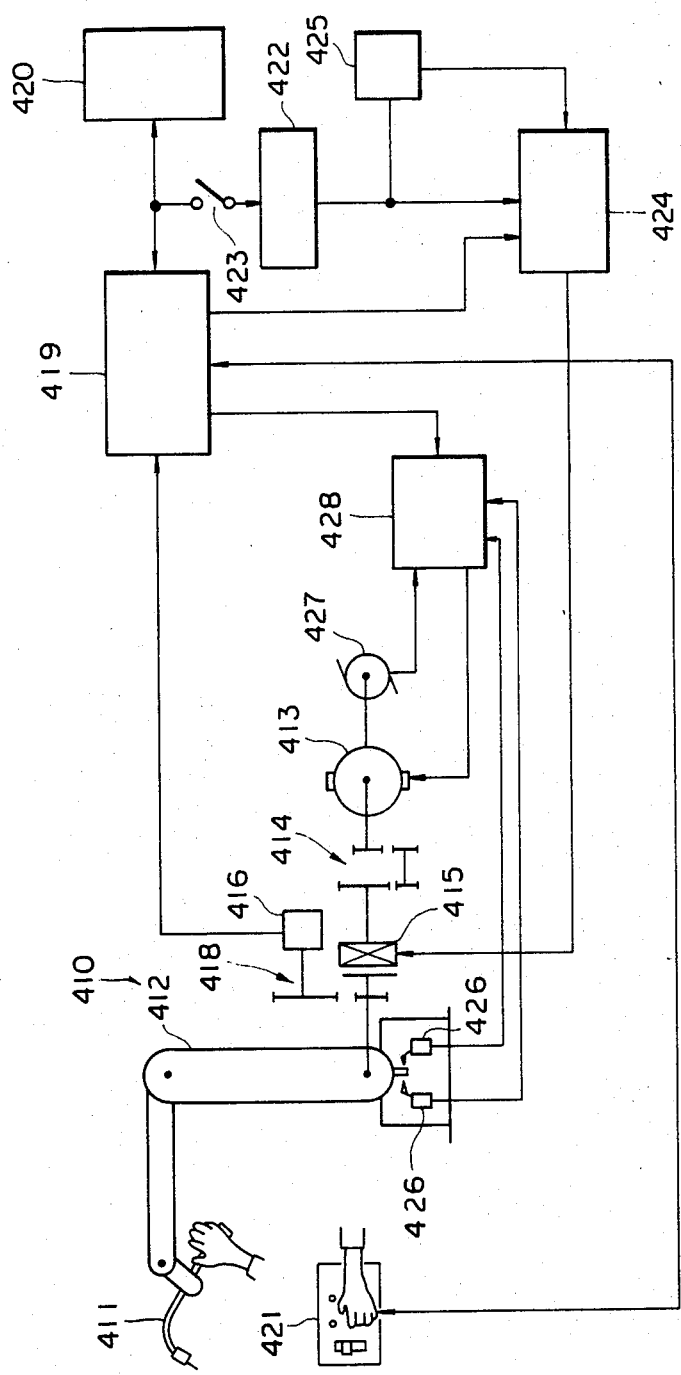
FIG. 20 is a block diagram of a control system incorporating means for limiting the movement of a robot element to a software-controllable operation range.

Referring now to FIG. 20, there is shown a further embodiment of the present invention, employing means for warning an operator when a robot is operated beyond a software-controllable operation range in the direct teaching operation. In FIG. 20, denoted at 410 is a multi-articulate welding robot, at 411 a welding torch, and at 412 a first arm. The first arm 412 is driven from a servo motor 413 through a reducer 414 and an electromagnetic clutch 415 which is interposed between the reducer 414 and the first arm 412. Indicated at 416 is a position detector, for example, a pulse encoder or the like which detects the positional data (angle) of the first arm 412 through a gear train 418 linked to an output sprocket 433 in engagement with the first arm 412, sending the detected positional data to a control circuit 419. The control circuit 419 is constituted by a part of, or the entire part, of arithmetic control means of a computer, preferably, of a microcomputer which is now shown. The control circuit 419 itself performs operations according to computer software and can give command signals to independent circuit means through a suitable interface. Designated at 420 is a memory device which stores the positional data from the aforementioned position detector 416 as well as the data of operational condition from a teaching box 421 which is interfaced with the control circuit 419.

On the other hand, indicated at 422 is a position control circuit which receives the output signal of the control circuit 419 through a mode switch 423 which is turned on at the time of teaching operation. During the teaching operation, the position control circuit 422 receives the positional data of the first arm 412 from the position detector 416 through the control circuit 419, constantly watching whether the position of the first arm 412 is within the software-controllable operation range. More particularly, it contains a comparator or an arithmetic comparative means to compare the positional data corresponding to the software-controllable operation range with the sequentially varying positional data of the first arm. As soon as the positional data deviate from the controllable range, it produces a command signal to a clutch on-off circuit 424 which controls the engagement and release of the electromagnetic clutch 415, coupling the clutch 415 upon receipt of the command signal. Further, the clutch on-off circuit 424 is independently controllable by the control circuit 419, for example, for maintaining the clutch 415 continuously in the engaged state during the playback operation by a signal from the control circuit 419. Instead of arranging the circuit 422 as an independent circuit, its functions may be incorporated into the software routine of the robot system if desired.

In the present embodiment, it is preferred to provide a timer 425 between the position control circuit 422 and the clutch on-off circuit 424, which is actuated by a command signal from the position control circuit 422 to produce a command signal to the clutch on-off circuit 424 upon lapse of a predetermined time period (preferably 2–3 seconds) from the actuated time point to release the electromagnetic clutch 415. By the provision of such a timer, the electromagnetic clutch 415 which is engaged by the deviation from the software-controllable range can be automatically released after a predetermined time period, permitting the operator to continue the teaching operation.

In FIG. 20, indicated at 426 are overrun limit switches, and at 427 a tachogenerator which is provided coaxially with the servo motor 413 to serve as a speed detecting means. The output signals of the overrun limit switches 426 and the tachogenerator 427 are fed to a servo driver circuit 428 which controls the servo motor 413. The servo driver circuit 428 controls the servo motor 413 in response to the command signal from the control circuit 419, but it is de-actuated during the teaching operation. On the other hand, in the playback operation, overrunning of the first arm 412 is prevented by the overrun limit switch 426 which is actuated by a striker of the first arm, de-actuating the servo drive circuit 428 to stop the servo motor 406 for security and at the same time for protective purposes.

In operation, upon setting in the teaching mode, the control circuit 419 produces a command signal to the clutch on-off circuit 424 to release the electromagnetic clutch 415. Then, the selector switch means 423 is changed into the teaching position. In this state, the operator can manipulate, for example, the welding torch 411 to teach the operational movements through the teaching box 421. The position of the first arm 412 is sequentially detected by the position detector 416, and its positional data are stored in the memory device 420 and at the same time fed to the position control circuit 422 to check if the arm is within the software-controllable operation range by comparative arithmetic operations. In the event the robot arm should overreach the preset positional data (representing the limit positions of the software-controllable operation range), the position control circuit 422 sends out a command signal to the clutch on-off circuit 424 thereby actuating the clutch on-off circuit 424 to engage the electromagnetic clutch 415. Whereupon, the manipulation of the robot arm 412 becomes very heavy since the output sprocket 433 is now connected to the reducer 414 and servo motor 413. Therefore, the operator can directly perceive from a sudden drag on the arm movement that the software-controllable operation range is overreached.

The command signal from the position control circuit 422 is also fed to and actuates the timer 425, which, upon lapse of two or three seconds from the actuated time point, produces a signal to the clutch on-off circuit 424 to release the electromagnetic clutch 415, so that the robot arm can be lightly returned to the software-controllable range to continue the teaching operation.

Although the teaching range limiter has been described in relation with a robot arm, it can also be applied for limiting the rotational angle of a rotatable base or pedestal or other movable robot element which has a freedom of movement in a particular direction.

FIGS. 21 to 24 illustrate another embodiment of the present invention, more particularly, a drive control system incorporating means for protecting an arm wrist or a tool portion of a robot against externally applied forces when it hits against an object by accident or similar situations.

Figure 21:
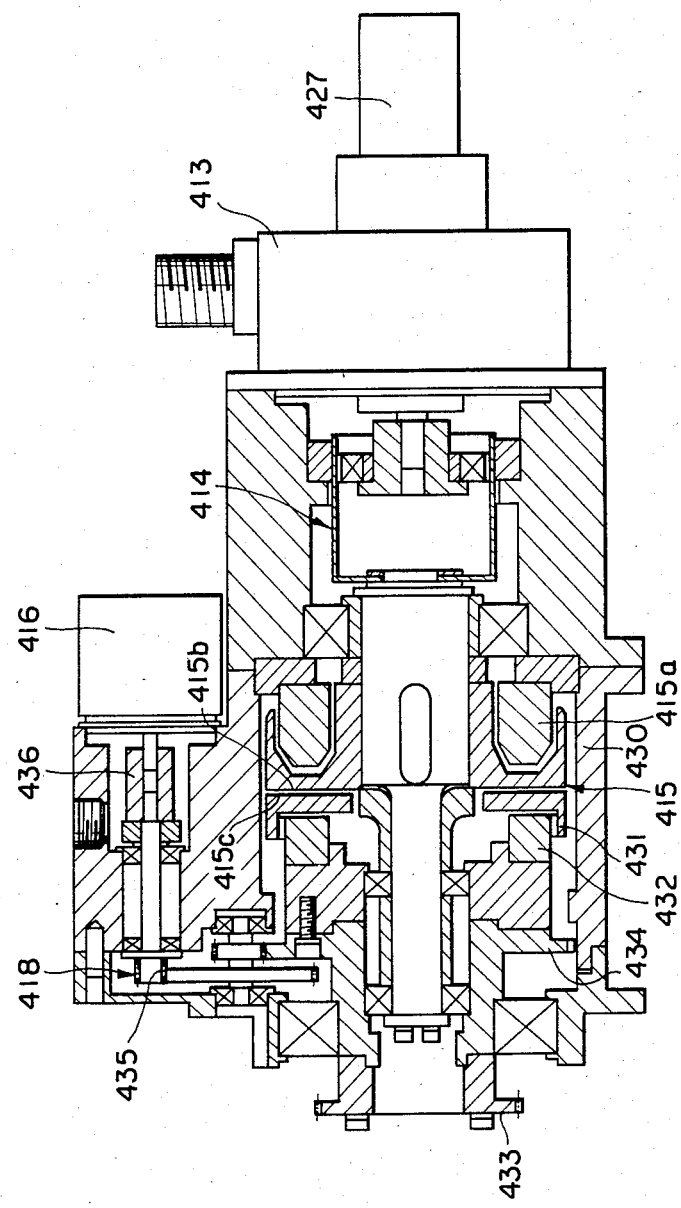
FIG. 21 is a cross-sectional view of an arm actuator.

Referring to FIG. 21, there is shown a wrist portion 501 of a robot, which is integrally provided with a welding torch 502 and driven from a motor M for rotation about a shaft 503. More specifically, the output shaft 504 of the motor M is coupled with a transmission means R like a reducer, and a clutch 505 is interposed between the reducer R and the wrist portion 501 of the robot. The rotational movement of the motor M is controlled by a central processing unit CPU which includes as its major components read-only memory ROM, random access memory RAM, and input and output interfaces $I_2$ and $I_1$. The position signal from the CPU is sent to a D/A converter 507 through the output interface $I_1$ for conversion to an analog quantity prior to application to a driver circuit 508. The drive circuit 508 which constitutes a sort of amplifier supplies drive current Ia to the motor M. Coupled with the output shaft 504 of the motor M is a pulse encoder 509 which supplies an up-down counter 510 with a number of output pulses proportional to the rotational angle of the output shaft 504 of the motor M. The just-mentioned pulse encoder 509 is an incremental type rotary encoder which is adapted to generate pulses in a number corresponding to an increment or decrement of the rotational angle of the motor output shaft 504. The output pulses of the pulse encoder 509 are integrated by the up-down counter 510 to detect the absolute position of the motor output shaft 504 (with regard to the initialization-point set by a an initialization mechanism as described hereinbefore). For detecting the rotational angle of the shaft 503 which connects the clutch 505 with the wrist portion 501 of the robot, there is further provided a pulse encoder 511 which is constituted by an incremental rotary encoder similar to the pulse encoder 509. The output pulse signal of the pulse encoder 511 drives an up-down counter 512 similar to the above-mentioned up-down counter 510 to detect the absolute rotational angle of the shaft 503. The periods of the output pulses of the pulse encoders 509 and 511 and the conversion rates of the counters 510 and 512 are preadjusted such that the output signals of the counters 510 and 512 are equivalent with each other as long as the shafts 503 and 504 and reducer R are completely free of torsion and the clutch 505 is coupled as will be described hereinlater. Therefore, a difference which occurs between the output values of the counters 510 and 512 when the clutch 505 is in the engaged state indicates a torsional deformation of the shaft 503 or 504 or of the reducer R, and a phase lag between the shafts 503 and 504.

The output terminals of the counters 510 and 512 are respectively connected to a comparator 513 which is in turn connected to a discriminator 514. Thus, the position signals $C_1$ and $C_2$, which are produced respectively by the counters 510 and 512, are applied to the comparator 513 to calculate the value of $(C_1-C_2)=\Delta C$, the difference between the two signals. The absolute value of the difference $\Delta C$ is compared with a predetermined reference value $\Delta C_0$ in the discriminator 514, which send out a cut-off signal to CPU through the input interface circuit $I_2$ when the absolute value of $\Delta C$ is greater when $\Delta C_0$. Upon receipt of the cut-off signal, the CPU sends out a stop signal to all of the drive sources which govern the freedom of movement of the wrist portion 501 in different directions. At the same time, the cut-off signal from the discriminator 514 is fed to a switch or a switching circuit 515 which is inserted between the driver circuit 508 for the motor M and a power source, and to an on-off switch 516 which is inserted between the clutch 505 and a power supply for the clutch 505, turning off the switches 515 and 516 to lower the output current from the driver circuit 508 to stop the motor M and release the clutch 505 to disconnect the wrist portion 501 of the robot from the reducer R.

As mentioned hereinbefore, the difference between the output signals $C_1$ and $C_2$ of the counters 510 and 512 becomes greater than the reference value $\Delta C_0$ when the phase difference between the shafts 504 and 503 exceeds a certain value, namely, when a large load is imposed on the wrist portion 501, causing torsional deformation to the reducer R or shaft 503 and 504 to an abnormally large degree. The imposition of such a large rotational load on the wrist portion 501 takes place when the wrist portion 501 of the robot or the welding torch 502 which is attached to the wrist 501 is hit against a rigid structure or object. On such an occasion, the switch 516 is instantly cut off and the clutch 505 is released, liberating the wrist portion 501 of the robot and permitting the same to move away from the obstacle for protection against damages. At this time, even if the welding torch 502 is liberated, it is desired to send the cut-off signal also to the switch 515 to stop the the motor M by restricting its input current Ia as mentioned hereinbefore, in order to prevent the wrist 501 of the robot or the welding torch 502 from being hit against other obstacles by continued rotation of the motor M.

For the teaching operation, a mode selector switch (not shown) which is provided on the control unit 506 is turned into the teaching mode position, whereupon CPU sends out a signal to the switches 515 and 516 through the interface circuit $I_1$ and line 417, similar to the afore-mentioned cut-off signal, to stop the motor M and release the clutch 505, so that the liberated wrist portion 501 of the robot can be lightly moved by manual operation. As the welding torch 502 is moved by gripping the liberated wrist portion 501, the displacement of the wrist portion 501 is measured by the pulse encoder 511 and the signal of its absolute position resulting from integration by the up-down counter 512 is fed to CPU through the switching circuit 518 and interface circuit $I_2$, storing the positional data in RAM at uniform time intervals. Upon completion of the teaching operation along a welding line in this manner, the operation is switched to the playback mode by turning the mode selector switch to the playback position. Whereupon, the switches 515 and 516 are closed by a signal fed through line 517 to turn on the driver circuit 508 and clutch 505. The positional data which are sequentially read out from RAM are fed to the driver circuit 508 through the interface circuit $I_1$ and after D/A conversion, thereby driving the motor M to move the wrist portion 501 of the robot along the path of movement taken in the teaching operation. The rotational angle of the robot wrist 501 is detected by the pulse encoder 511, and the up-down counter 512 which produces an output signal of an absolute value according to the output pulses of the pulse encoder 511. The output absolute signal of the up-down counter 512 is fed back to CPU and compared with the target signal read out from RAM to correct the rotational angle of the motor M automatically. Upon starting the playback operation, the contents of the counter 510 are initialized at the value of the counter 512 by a transfer circuit 530 in response to a command received from CPU (via line 531), so that thereafter the output values of the counters 510 and 512 conform with each other. Therefore, arrangement may be made such that the switching circuit 518 is changed over upon initiation of the playback operation to feed back to the CPU the positional signal from the counter 510 for automatic control of the rotational position of the robot arm. In such a case, the switches 515 and 516 are likewise opened by a signal from the discriminator 514 to stop the motor M and release the clutch 505 when the difference between the output signals of the counters 510 and 512 exceeds a reference value. However, simultaneously with or slightly in advance of this operation, it is necessary to change over the switching circuit 518 to connect the counter 512 to CPU. When the data of the rotational position of the output shaft of the motor M is fed back, it becomes possible to stabilize the control characteristics more effectively as compared with the feedback of the output signal of the pulse encoder 511 which involves a delay of detection due to the existence of the reducer R, with an advantage that it is less susceptible to the oscillatory condition even if the loop gain is raised. Of course, the switching circuit 518 is not necessary when the position control relies solely on the signals from the counter 512.

Further, it is also possible to employ a motor M with a clutch brake which is actuatable for stopping the motor M instead of cutting off the drive current from the driver circuit 508 as described hereinabove.

Figure 22:
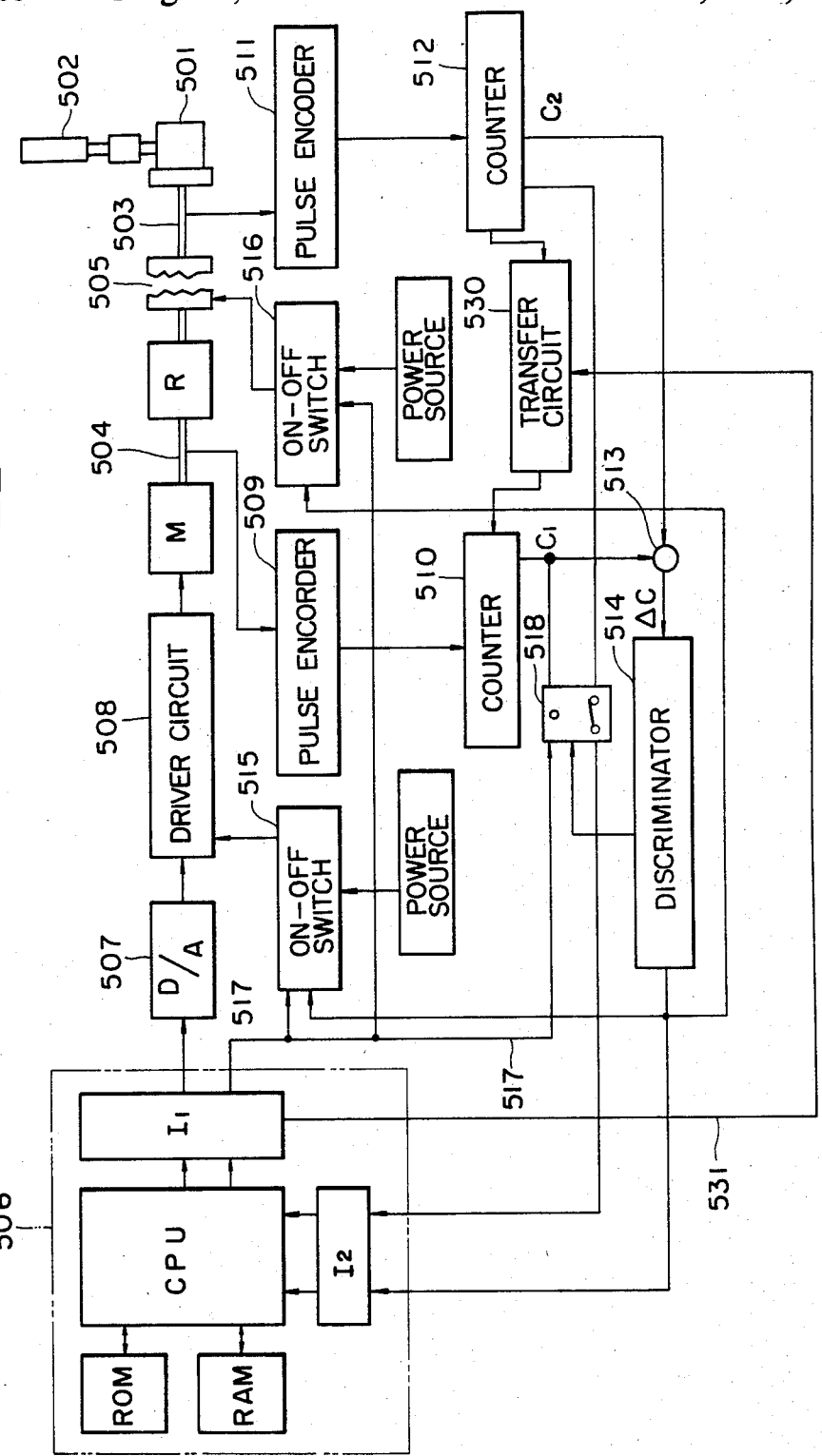
FIGS. 22 and 23 are block diagrams showing examples of a control system incorporating a protection circuit for the robot wrist portion or other robot element.
Figure 23:
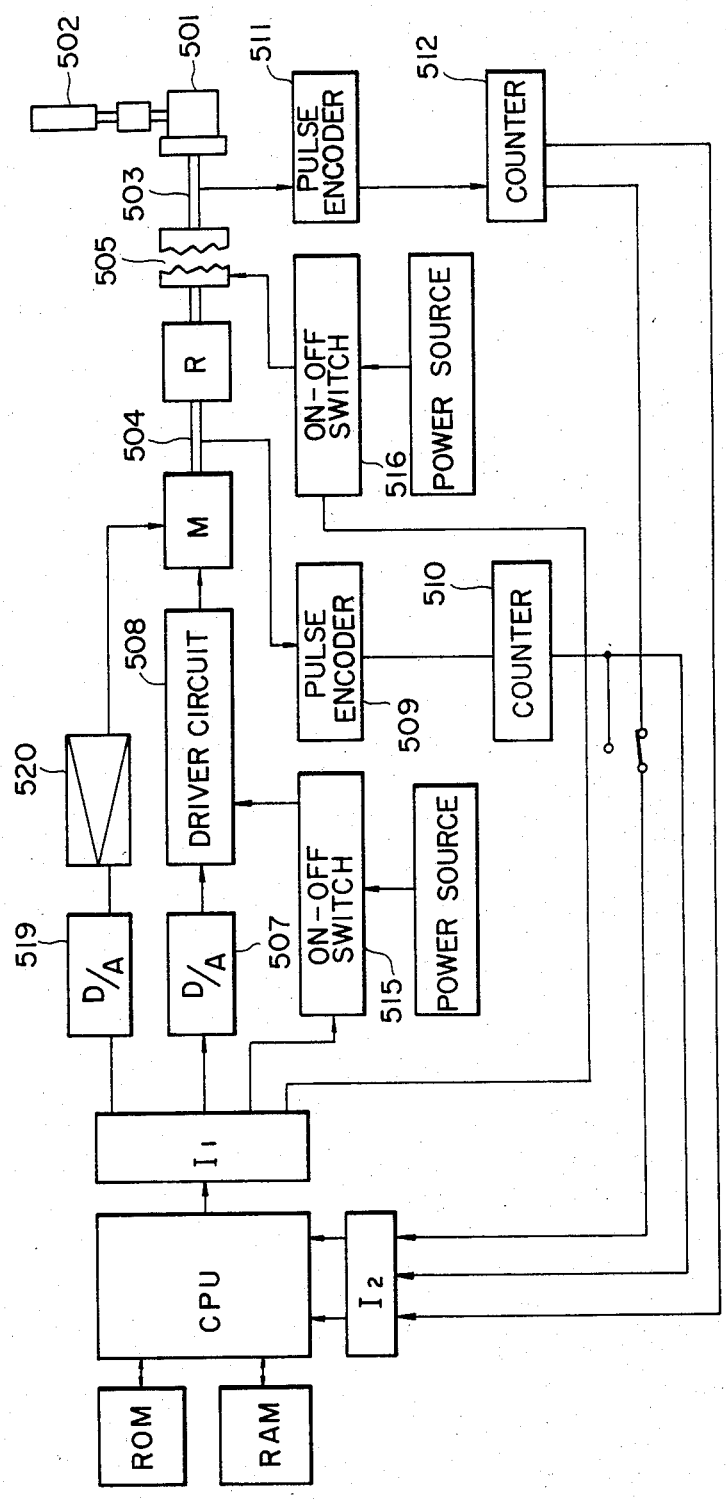
Figure 24:
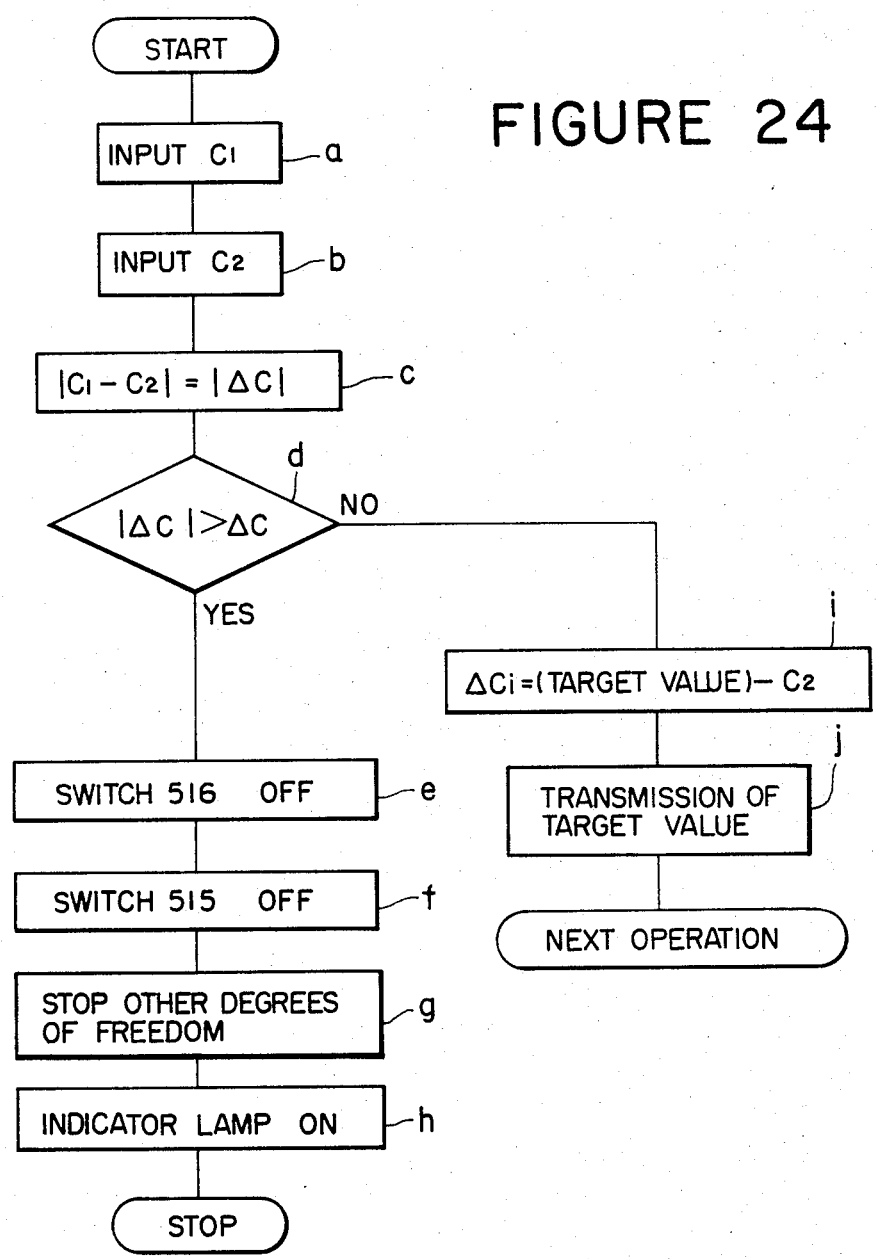
FIG. 24 is a flow chart showing the steps of operation followed by the control system of FIG. 23.

Although the comparator 513 and discriminator 514 are provided separately and externally of the control section 506 in the embodiment of FIG. 22, they may be omitted in a case where the positional data are processed internally of the CPU according to a program loaded in ROM, connecting the counters 510 and 512 to CPU as shown in FIG. 23. In this case, the position signals $C_1$ and $C_2$ of the counters 510 and 512 are directly fed to CPU as shown in FIG. 24 (Steps a and b) to calculate the difference $\Delta C$ between the two signals. The absolute value of the difference $\Delta C$ is then compared with a predetermined reference value $\Delta C_0$ in Step d, sending out a cut-off signal to the switches 415 and 416 to turn them off when the absolute value of $\Delta C$ is greater than the reference value $\Delta C_0$ (Steps e and f). In the steps g and h, the motor or motors which govern the motions in other directions are stopped and a warning indicator lamp is turned on. If the reference value $\Delta C_0$ is found to be greater in Step d, the position signal $C_2$ from the counter 512 is compared by the CPU with the target value read out from RAM (Step i), and a corrected target value is fed to the motor M through the D/A converter 507 and the driver circuit 508 (Step j) to control the rotational position automatically. In a case where the motor M is equipped with a clutch brake, the stop signal is directly fed out from CPU and applied to the motor M through the D/A converter 519 and amplifier 520.

Figure 25:
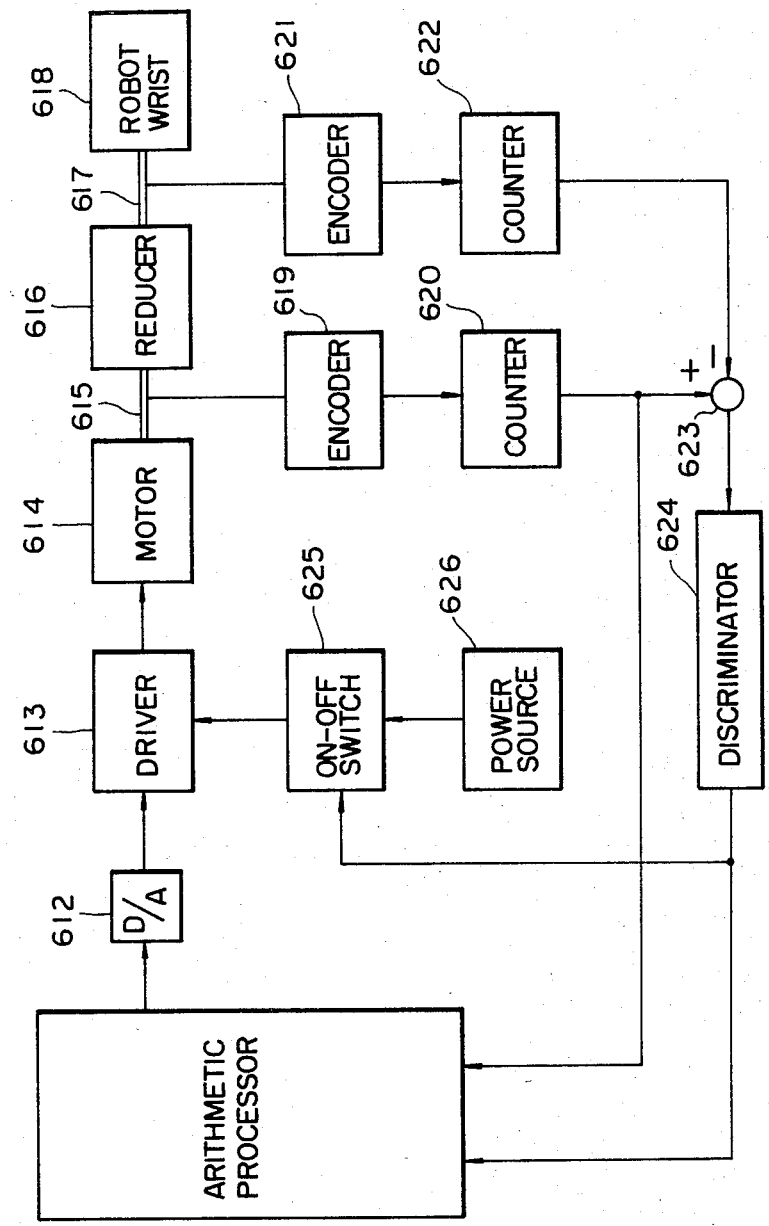
FIG. 25 is a block diagram of a control system incorporating a protection circuit to prohibit application of an unduly large torque to the transmission of the robot actuator.

Referring to FIG. 22, there is shown a control system including means for limiting the power (torque) to be applied to the transmission by the drive section of the actuator for protecting the reducer and other transmission system against damage which would be caused by application of an unduly large torque, utilizing the principles that the transmission is subjected to a torsional deformation in proportion to the torque applied thereto. In FIG. 25, indicated at 11 is an arithmetic processor 611 which is constituted by a microcomputer including a central processing unit (CPU), RAM for storing a system program, RAM for storing arithmetic data, an I/O port and the like.

A speed (or position) command signal which is produced by the arithmetic processor 611 is converted into an analog value by a D/A converter 612 prior to application of a motor driver 613. The motor driver 613 is a sort of amplifier which produces at its output terminal a drive current Ia for driving a motor 614. The output shaft 615 of the motor 614 is connected to a wrist portion 618 or other robot element through a reducer (transmission) 616 and a shaft 617 for driving the wrist portion 618. Mounted on the output shaft 615 of the motor 614 is a pulse encoder 619 which generates pulse signals in proportion to the rotational angle of the motor output shaft 615, more particularly, an incremental type rotary encoder which produces pulse signals in a number corresponding to an increment or decrement of the rotational angle of the output shaft 615. The output pulses of the pulse encoder 619 are integrated by an up-down counter 620 to detect and store in memory the absolute position of the output shaft 615 of the motor 614.

A second pulse encoder 621 of a type similar to the above-mentioned first pulse encoder 619 is mounted on a shaft 617 which connects the reducer 616 with the wrist portion 658 of the robot, the output pulses of the second pulse encoder 621 being applied to and integrated by an up-down counter 622 to detect the absolute position of the shaft 617. The count values of the up-down counters 620 and 622 are applied to a subtractor 623 which produces a differential signal indicative of the difference between the output values of the counters 620 and 622. The frequency of the output pulses of the pulse encoders 619 and 621 and their conversion rates are preset such that the subtractor 623 produces a differential signal of "0" when there is no torsional deformation between the output shaft 615 of the motor 614 and the output shaft 617 of the reducer 616.

The output terminal of the subtractor 623 is further connected to a discriminator 624 which compares the differential signal from the subtractor 623 with a preset allowable differential value to check if the differential signal is smaller than the allowable value. The output signal of the discriminator 624, indicative of the results of the comparison, is applied to an on-off switch 625 and the arithmetic processor 611. Indicated at 626 is a power supply for the motor driver 613, which supplies the source voltage to the motor driver 613 as long as switch 625 is closed.

In this embodiment, the position command signal which is produced by the arithmetic processor 611 applied to the motor driver 613 after conversion into an analog value at the D/A converter 612, so that in normal operation, the switch 625 is kept on to supply the source voltage from the power supply 626 to the motor driver 613 to drive the motor 614 with a voltage conforming with the input signal. Upon driving the motor 614 in this manner, the motor output shaft 615 and the output shaft 617 of the reducer 616 are rotated in a predetermined relation to move the wrist portion 618 of the robot in a desired direction. As long as the robot is operated under normal conditions, the deformation of the reducer 616 is small enough, and the pulse encoders 619 and 621 produce substantially the same numbers of output pulses. In this case, the differential signal from the subtractor 623 is smaller than the preset allowable value, so that the discriminator 624 produces no "abnormal" signal.

However, should the wrist portion 618 of the robot be hit against an obstacle during its movement, the load which is imposed on the wrist 618 is increased abruptly, causing a large torsional deformation across the reducer 616. Consequently, there occurs a large difference between the numbers of the output pulses of the pulse encoders 619 and 621, and the output differential signal of the subtractor 623 which is connected to the respective pulse encoders through counters 620 and 622 becomes greater than the preset allowable value of the discriminator 624. Therefore, the discriminator 624 produces an "abnormal" signal to turn off the switch 625, thereby cutting off the voltage supply to the motor driver 613 from the power supply 626 to stop the drive of the motor 614. As a result, the wrist portion 618 is stopped where it is. The "abnormal" signal from the discriminator 624 is also fed to the arithmetic processor 611 thereby to actuate an indicator and stop the operation.

Figure 26:
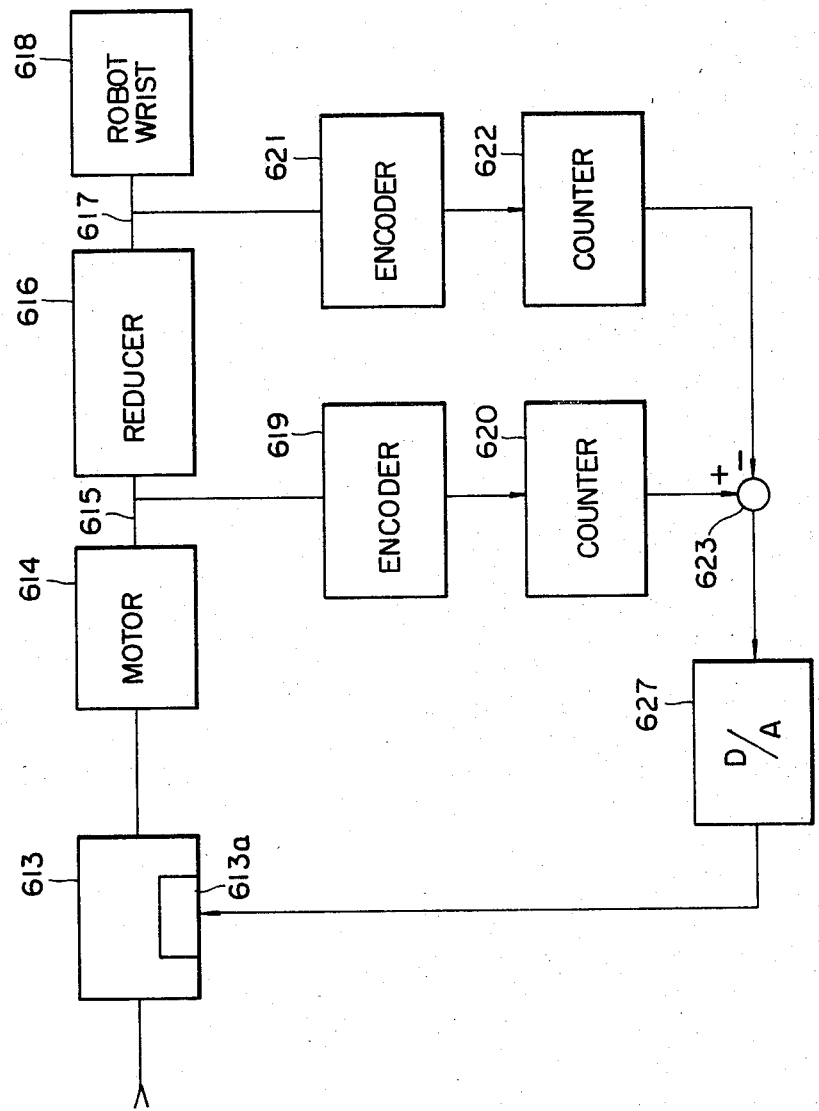
FIGS. 26 and 27 are block diagrams showing modifications of the transmission protection circuit.

FIG. 26 shows a modification of the protection system of FIG. 25, in which like component parts are designated by like reference numerals. In the modification of FIG. 26, a D/A converter 627 is connected to the output terminal of the substractor 623 instead of the discriminator 624 of FIG. 25. The absolute rotational positions of the output shaft 615 of the motor 614 and the output shaft 617 of the reducer 616 are similarly detected by the pulse encoders 619 and 621 and the counters 620 and 622, calculating the difference of the output values of the counters 620 and 622 by the subtractor 623. The output differential signal of the subtractor 623 is applied to a current limit circuit 613a of the motor driver 613 after conversion into an analog value by the D/A converter 627. In this instance, if the wrist portion 618 of the robot is hit against an obstacle, a large torsional deformation occurs between the shafts 615 and 617, causing a large difference between the output values of the counters 620 and 622 and thus applying a large feedback to the current control circuit 613a through the D/A converter 627 to restrict or stop the drive of the motor 614.

Figure 27:
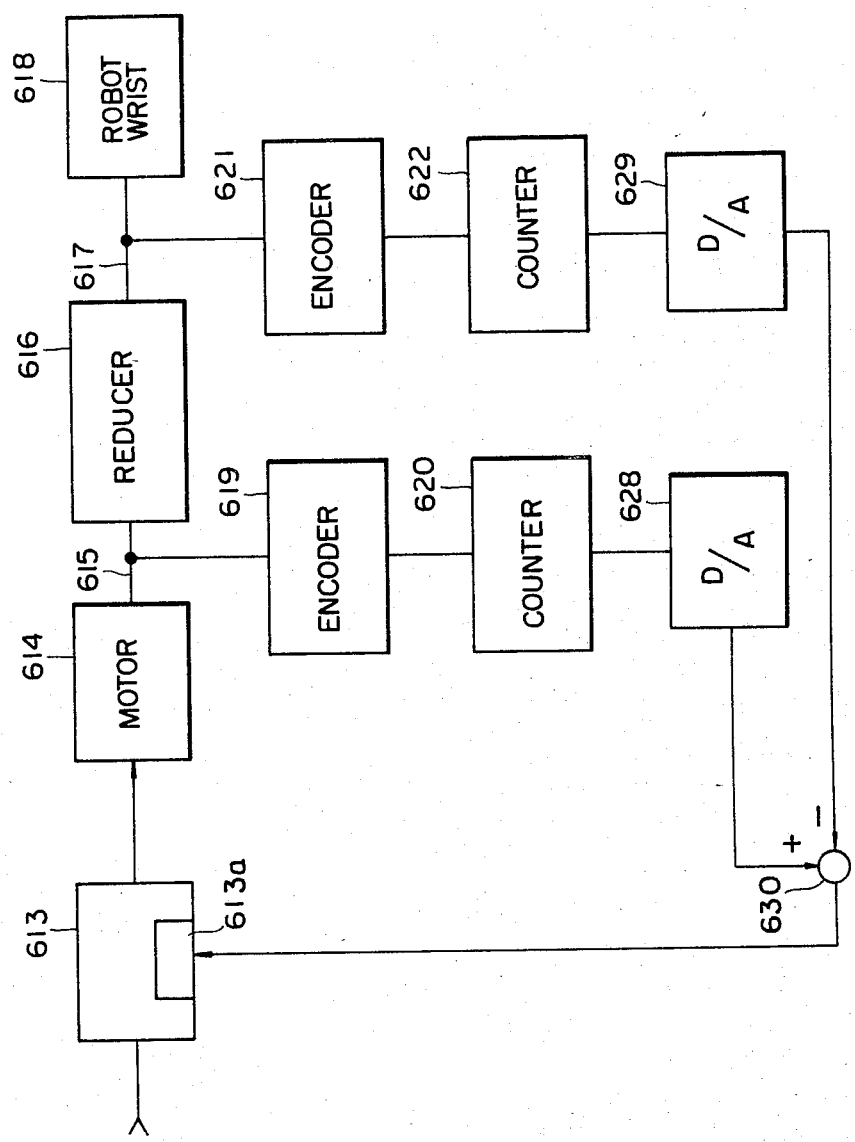

FIG. 27 shows another modification of the protection circuit, which differs from the foregoing modification in that the output values of the counters 620 and 622 are converted into analog values through D/A converters 628 and 629, respectively, and applied to a subtractor 630 to calculate the differential value of the two signals for feedback to the current control circuit of the motor driver 613. This modification is advantageous particularly in a case where it is difficult to equalize the frequency of the numbers of the output pulses of the two pulse encoders 619 and 621.

Figure 28:
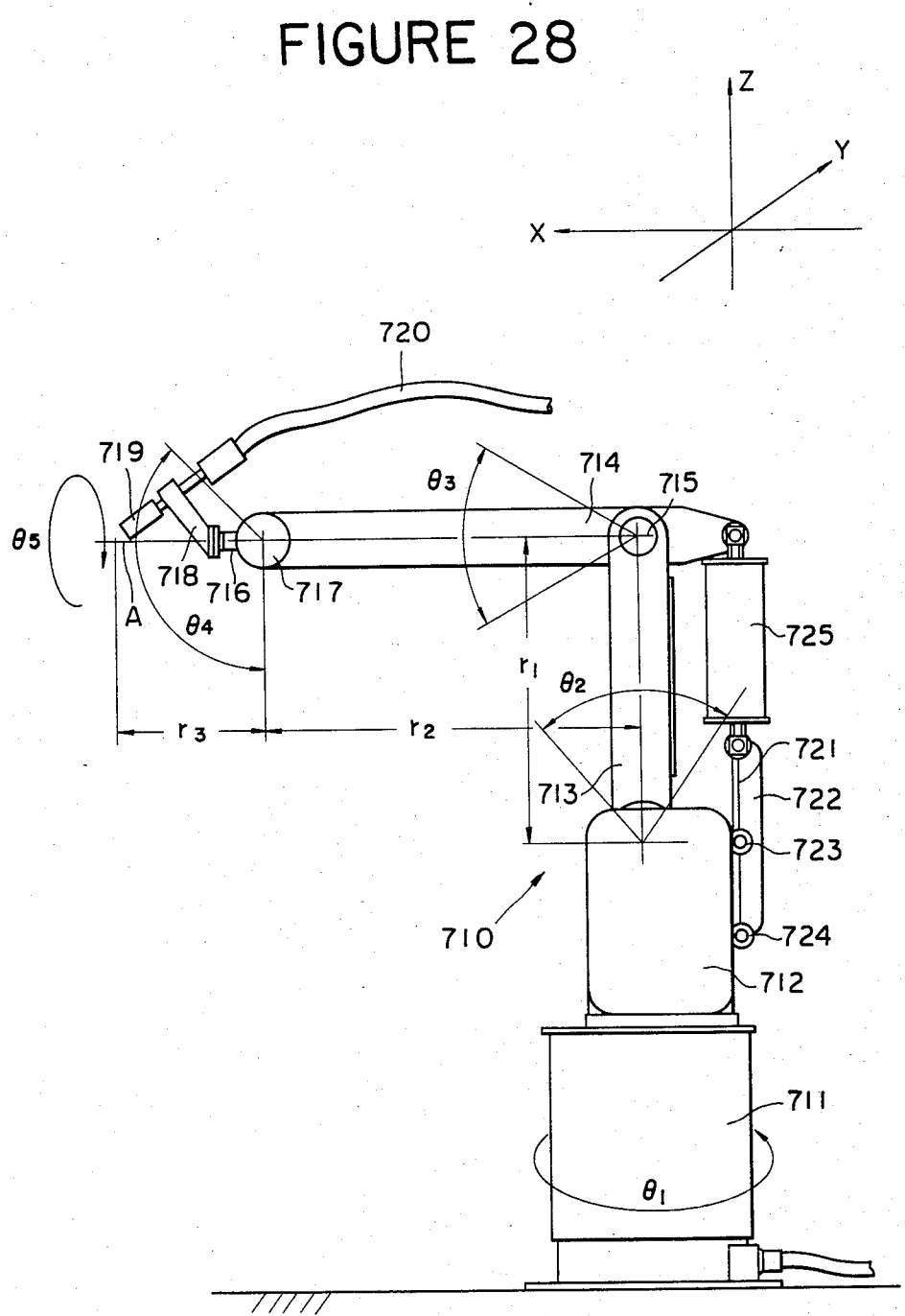
FIG. 28 is a side elevational view of a welding robot which is applicable to a direct PTP teaching operation according to the present invention.

Referring now to FIG. 28, there is shown at 710 an industrial welding robot 710 with five degrees of freedom, having on a swivel base 711 a drive section 712 including a plural number of (e.g., four) electric motors for driving arm and wrist portions of the robot. In the particular example shown, the robot 710 is provided with a first arm 713 which is swingable in a vertical plane over the swivel base 711, a second arm 714 pivotally supported at the fore end of the first arm 713 through a shaft 715, and a wrist portion 716 mounted at the fore end of the second arm 714 through a wrist mechanism 717. A welding torch 719 which is fixed to the wrist portion 716 through a torch bracket 718 has its rear end connected to a cable 720. The cable 720 is an assemblage of a conduit cable, a power cable and a gas hose.

Indicated at 721 to 724 are members of a link mechanism for operating the second arm 714, of which the link member 722 has a relatively large weight for offsetting the gravitational moment of the second arm 714 in cooperation with a spring-balancing mechanism which will be described hereinafter. Namely, a spring-balancing mechanism 725 is interposed between the other end of the second are 714 and the link member 722 for the second arm to offset substantially completely the gravitational moment resulting from the weight of the first arm 713 itself. In this instance, the second arm 714 is balanced by the weight of the spring balancing mechanism 725 which is designed to counterbalance the moment of the second arm 714 about the pivotal shaft 715.

In FIG. 28, $r_1$ is the distance between upper and lower pivoting shafts of the first arm 713, $r_2$ is the distance between the shaft 715 and the wrist 717, point P is the intersection of the axis of the wrist portion 716 and the direction in which the welding torch 719 is oriented, and $r_3$ is the distance between the point P and the wrist joint 717. In this instance, the point P corresponds to the fore end of the welding torch 719, and the orthogonal coordinates (X, Y, Z) of the point P is determined solely by the posture of the robot 710 in an orthogonal coordinate system having a vertical, upwardly extending Z-axis, an X-axis along which the second arm 714 extends when the robot 710 is in a basic posture, and a Y-axis extending in a direction perpendicular to the plane XZ (extending from the front to back side of the figure).

The movable angles of the respective joints are indicated by $\theta_1 - \theta_5$. More specifically, the angle $\theta_1$ is the rotatable range of the swivel base 701, the angle $\theta_2$ is the pivotable range of the first arm 713, $\theta_4$ is the tiltable range of the welding torch 719, and the angle $\theta_5$ is the twistable range of the welding torch 719.

The rotation ($\theta_1$) of the swivel base 701 is effected by an electric motor which is mounted in the swivel base, but the electric motors for the motions ($\theta_1 - \theta_5$) are provided respectively in the driven parts including the first and second arms and the wrist portion 712. As described in the foregoing embodiments, each motor is provided with a reducer, a position detector, a speed detector and a clutch mechanism for coupling and uncoupling the motor although they are omitted from illustration. The angles $\theta_1 - \theta_5$ of the respective joints are detected by the position detectors. Of course, the clutches are released prior to a manual or direct teaching operation to disconnect the robot elements from the drive motors.

FIG. 29 is a block diagram of the control system for the above-described robot 710 with the welding torch 719, in which indicated at 726 is a position detector, at 727 an arithmetic processor, and at 728 a memory for storing various data which are necessary for the playback operation. In this embodiment, the displacement of the fore end (point P of FIG. 28) of the torch 719 is calculated from the positional data detected by the position detector 726. At the time point when the displacement of the fore end of the torch 719 amounts to a predetermined value l, the positional data for each degree of freedom of the robot are stored in the memory. Thus, the displacements of the fore end P of the torch 719 are determined by calculations in the teaching operation without using any auxiliary means like the teaching roller which has thus far been resorted to for sampling over a predetermined distance.

Figure 30:
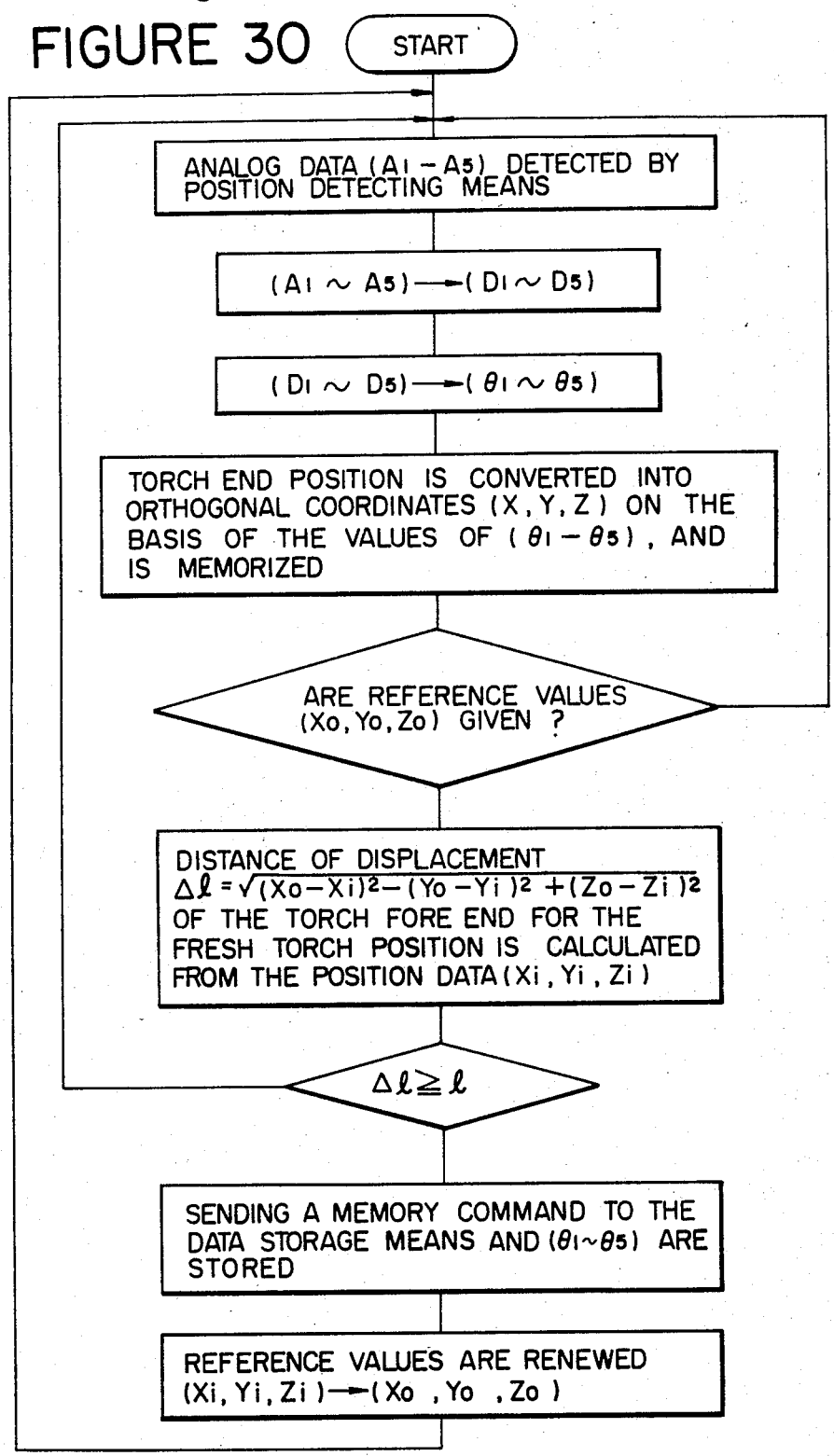
FIG. 30 a flow chart showing the steps followed in the direct PTP teaching operation according to the invention.

Referring to FIG. 30, firstly the position of the robot body 710 at the initial point of the teaching operation is detected by the position detector 726. The analog data $A_1$ to $A_5$ (for the five degrees of freedom) which are produced by the position detecting means 726 are converted into digital data $D_1$ to $D_5$ for digital processing. This is applicable only to those cases where a resolver or the like is used as a position detector, and the A/D conversion is not necessary when pulse encoders are used.

The digital signals $D_1 - D_5$ are converted into angles of displacement $\theta_1 - \theta_5$ from the respective reference positions by the arithmetic processor 727, and the torch end position P is converted into orthogonal coordinates (X, Y, Z) on the basis of the values of $\theta_1 - \theta_5$ according to the following equations.

$X = (r_1 \cos \theta_2 + r_2 \cos \theta_3) \cdot \cos \theta_1 + r_3 \cos \theta_1 \cdot \cos \theta_4$ $Y = (r_1 \cos \theta_2 + r_2 \cos \theta_3) \cdot \sin \theta_1 + r_3 \sin \theta_1 \cdot \cos \theta_4$ $Z = r_1 \sin \theta_2 + r_2 \sin \theta_3 + r_3 \sin \theta_4$ The values of X, Y and Z are temporarily stored in storage means (register) or buffer memory of the arithmetic processor 727. In this instance, the control is advanced to the next step if reference values (Xo, Yo, Zo) are given beforehand for the calculation of the amounts of displacement. If not, the movement of the robot 710 is traced, using the current values of X, Y and Z as reference values for processing the next position data.

In the next step, the distance of displacement of the fore end P of the torch is determined from the reference values (Xo, Yo, Zo) and fresh torch position data (Xi, Yi, Zi) which are read in at a following instant. The value of $\Delta l$ is calculated from the equation of $$\Delta l = \sqrt{(Xo - Xi)^2 + (Yo - Yi)^2 + (Zo - Zi)^2}$$

Thus, the positional data (Xi, Yi, Xi) are sequentially obtained as the robot body 710 is moved along a welding line, and the distance of displacement $\Delta l$ of the fore end P of the torch from the reference point (Xo, Yo, Zo) is determined according to the equation given above. If the value of $\Delta l$ reaches a preset distance data l, the arithmetic processor 727 sends a memory command M to the data storage means 728 to store therein the digital data $\theta_1 \sim \theta_5$ at an instant when $\Delta l \geqq l$. These digital data $\theta_1 \sim \theta_5$ are the position data from the position detector means prior to conversion into orthogonal coordinates (Xi, Yi, Zi). Simultaneously with this storage of digital data, the currently stored reference values (Xo, Yo, Zo) are renewed by the orthogonal coordinates (Xi, Yi, Zi) corresponding to the digital data $\theta_1 \sim \theta_5$ to serve as new reference values.

As the fore end P of the torch is moved by manipulation of the robot body 710, the above-described arithmetic operation is repeated, sequentially storing the position data $(\theta_1 \sim \theta_5)$ or $(A_1 \sim A_5)$ or $(D_1 \sim D_5)$ in the data storage means. The position data $(\theta_1 \sim \theta_5)$ are used as basic data for tracing the locus of welding in the playback operation.

FIGS. 31 and 32 illustrate some examples of the torch arrangement in the above-described teaching operation without using the conventional teaching roller. In the example of FIG. 31, the distal end of a welding wire 729 which is protruded from a welding torch 729 by a suitable length h is moved along a welding line 730 for teaching same.

FIG. 32(a) shows a teaching method in which a teaching stick 733 is attached to the fore end of a wire conduit 732 which is fixed within a shield nozzle 731, and the stick 733 is moved along and in contact with the welding line 730. In this case, of course, the length of the stick 733 strictly corresponds to the predetermined length of wire extension in the welding operation. In the playback operation, the stick 733 is removed and, as shown in FIG. 32(b), a contact tip 734 is attached to the fore end of the wire conduit 732 in the usual manner, extending the welding wire 729 by an appropriate length. In a case where the teaching stick is formed in a hollow nozzle-like shape with a conical portion at the fore end of a cylindrical body, it is possible to teach the welding line without removing the contact tip. In such a case, the stick is used only in teaching operations and it is replaced by a nozzle prior to a welding operation.

In the direct teaching of a welding line, the so-called PTP method has been often resorted to, instructing a number of points (coordinates) on the locus of the welding line in the first step of teaching by pressing a switch which is provided in the vicinity of the torch. In the second step of teaching, while a robot plays back the movement between the instructed points, other input data such as the linear or circular interpolation of the instructed points, the start and end points of the welding operation and various welding conditions (voltage, current, speed, weaving etc.) are given through a teaching box (by remote control). However, the two-step teaching is troublesome, and the input of diversified data in the second step of teaching involves various difficulties.

Figure 33:
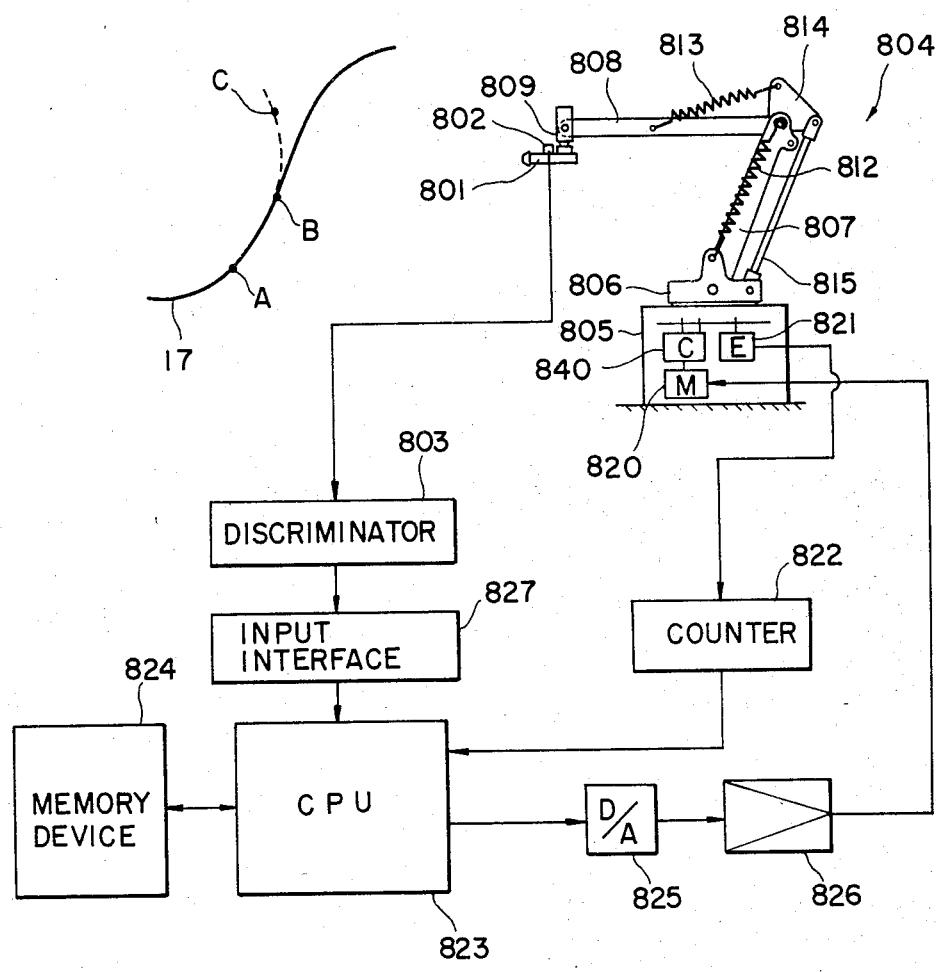
FIG. 33 is a block diagram of a welding robot and its control system, employing a switch on a welding torch thereby to produce a variety of coded instruction signals in direct PTP operation.
Figure 34A:
FIGS. 34(a) to 34(d) are diagrams showing the coded instruction signals produced by on-off operation of one switch.
Figure 34B:
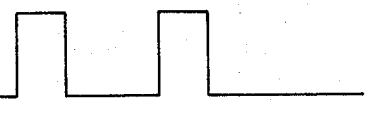
Figure 34C:
Figure 34D:
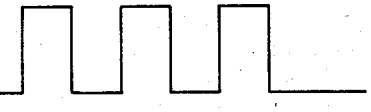
Figure 35:
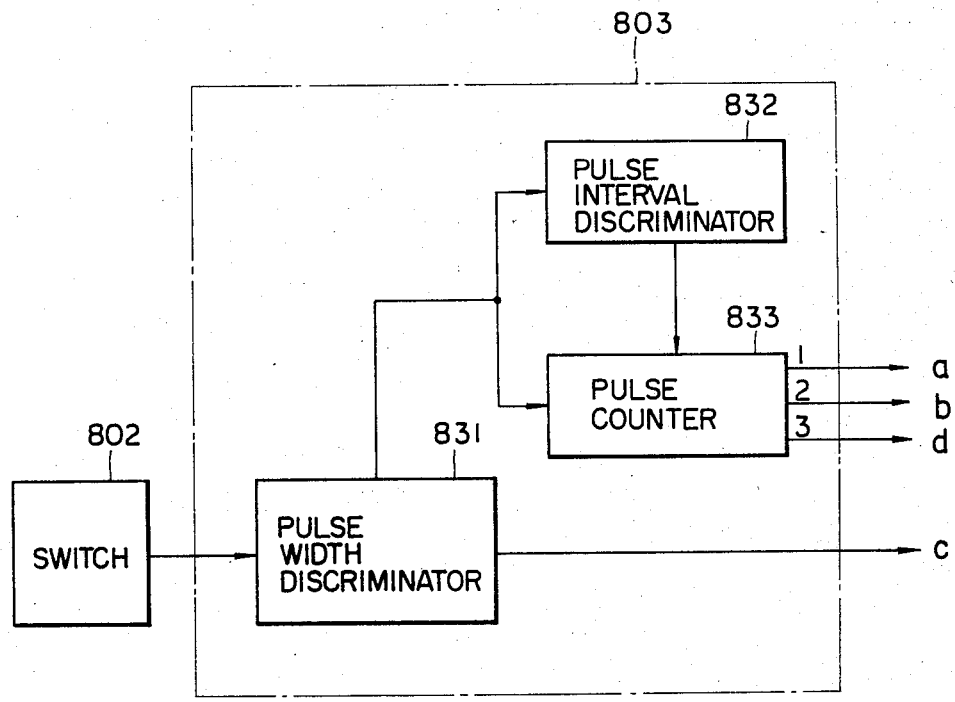
FIG. 35 is a block diagram showing the circuit arrangement of a discriminator.

In this connection, FIGS. 33 to 35 shows a simplified method of PTP teaching, giving all the necessary instruction signals by the use of a single switch means. More specifically, as shown in FIG. 33, a switch 802 is provided on a welding torch 801, in combination with a discriminator 803 which detects the number of times of the on-off operation of the switch 802 and the length of operation time. The robot which is generally indicated by the reference numeral 804 includes as its main components a box portion 805, a swivel base 806, a first arm 807, a second arm 808, a wrist portion 809, a first arm balancing spring 812, a second arm balancing spring 813, a triangular plate 814 and a upper arm link 815. To ensure light movement of the first and second arms 807 and 808 and the wrist portion 809 when they are manipulated in the direct teaching operation, gravitational balancers 812 and 813 are provided on the robot, in addition to uncoupling means (e.g., a clutch 840) for releasing the robot elements from the respective power source. A power source, for example, a servo motor 820 is provided for each operating shaft. As in the foregoing embodiment, the output pulse signals of pulse encoders 821 which are associated with the respective operating shafts directly or through gears or the like are processed in an arithmetic processor CPU to obtain the positional data of the robot 804. Memory 824 stores the instructed data and feeds the same to CPU 823 when the robot 804 is put in operation. The output digital signals of CPU 823 are fed to the motor 820 through D/A converter 825 and an amplifier.

The output of the switch 802 which is provided on the welding torch 801 is fed to the discriminator 803 and the output of the discriminator 803 is fed to CPU 823 through input interface 827.

FIG. 34 shows an example of coding of the output command signals produced by manipulation of the switch 802. More particularly, the signal of FIGURE 34(a) which consists of a single pulse with a width or duration shorter than 3 seconds instructs storage of positional data of a point. The signal of FIG. 34(b), which consists of a couple of pulses with a duration shorter than 3 seconds and spaced by an interval shorter than 3 seconds, instructs storage of positional data of a mid point of an arcuate locus of operation. Shown in FIG. 34(c) is a single broad pulse with a duration longer than 5 seconds, indicating a welding line. The signal of FIG. 34(d), consisting of three pulses each having a duration shorter than 3 seconds and spaced by an interval shorter than 3 seconds, indicates alteration of the operating condition.

These command signals are fed to the discriminator 803 through a suitable buffer. As illustrated particularly in FIG. 35, the discriminator 803 is provided with a pulse width discriminating circuit 831 which receives the output signals of the switch 802, a pulse interval discriminating circuit 832, and a pulse counter 833, producing one of the command signals a, b, d and c (corresponding to the pulse signals a, b, d and c of FIG. 34). The pulse width discriminating circuit 831 is started upon receipt of the pulse signal from the switch 802 to determine the pulse width by means of counting clock pulses of a suitable frequency. If the pulse duration is longer than 5 seconds, it produces the welding command signal c. On the other hand, if the count of the clock pulses is shorter than 3 seconds, the pulse width discriminating circuit 831 starts the pulse interval discriminating circuit 832 and sends the pulse signal to the pulse counter 833. If the pulse interval is detected to be longer than 3 seconds (the end of the pulse signal), the pulse interval discriminating circuit 832 sends command output and reset signals to the pulse counter 833. Upon receipt of this signal, the pulse counter 833 sends a command signal of count 1(a), count 2(b) or count 3(c) to CPU through the input interface 827. The output signal of count 1 is a command of data storage, the output signal of count 2 is a command of data storage and circular interpolation, and the output of count 3 is a command of data storage and alteration of operational condition. The command signals from the discriminator 803 are fed to CPU 823 in the same manner as in the conventional data input operation using a teaching box. Namely, the output of count 2 of the pulse counter, which is recognized as a command by the CPU, is equivalent to the signal which is recognized by the CPU when a corresponding switch (a switch for instructing the midpoint of an arc) on the conventional teaching box is depressed.

In the direct teaching operation, more than two kinds of data of points or a line on the locus of welding are discriminated in the following manner. Referring to FIG. 33, the operator normally grips the welding torch 801, for example, by the left hand, putting the thumb on the switch 802, while supporting the second arm 808 with the right hand during the following PTP teaching operation.

(1) In order to teach a straight welding line between points A and B, firstly the switch 802 is depressed once at the point A (for a time period shorter than 3 seconds) to produce the pulse signal (a), sending the command signal a to CPU to store the coordinates of the point A in the memory 824. Thereafter, the switch 802 is depressed again but this time continuedly during the straight movement to the point B, and released upon reaching the point B. As a result, the pulse signal (c) is produced to send the command signal c to CPU which therefore stores in the memory 824 the data that a straight welding line continues from the point A to B. At the point B, the switch 802 is depressed again for a short time period to store the coordinates of the point B.

(2) In order to teach an arcuate welding line extending from points A to C through point B, the switch 802 is once depressed at the point A, of course, for a time period shorter than 3 seconds. Nextly, the switch 802 is depressed continuously between the points A and B for a time period longer than 5 seconds, releasing same upon reaching the point B. At the point B, the switch 802 is depressed for two times, of course, for a period shorter than 3 seconds each time, to produce the pulse signal (b), whereupon the command signal b is fed to CPU. As a result, the coordinates of the point B are stored in the memory 824, along with data specifying the point B as a mid point of an arc. The switch 802 is continuously depressed between the points B and C, and once depressed for a short time period at the point C to store its coordinates in the memory.

(3) In order to teach a straight air-cut from point A to B, the switch 802 is depressed once at the point A, and then the torch is moved to the point B without depressing the switch 802 (for a time period longer than 5 seconds). The switch 802 is depressed once at the point B to store its coordinates in the memory.

(4) In order to teach a condition altering point at which the welding condition is to be changed, the switch 802 is depressed three times at that point to produce the pulse singal (d) to send the command signal d to CPU 823, storing in the memory 824 the coordinates of the altering point along with a sign that it is a condition altering point. In this case, it is taught simply that the welding condition is changed at and after that point. The particulars of the new welding conditions are given in the second step of teaching through a condition control panel or a teaching box.

In the second step of the teaching operation, the details of the operational condition are given through a teaching box similar to the conventional operation, but the procedures of the second teaching can be simplified considerably, permitting a significant reduction of the teaching time.

The function of discriminating the coded signals by the discriminator 803 may be performed by the arithmetic processor of the central processing unit if desired. It is relatively easy in a case where the arithmetic processor includes a microprocessor or a microcomputer.

Although a push-button type switch is used in the foregoing embodiment, the switch 802 may be of any type as long as the manual on-off operation is possible. For example, it may be a lever switch or a touch switch. Any way, there should be selected a switch of a suitable type which is handy enough in consideration of the particular condition of the position at which it is intended to be mounted. In the case of a welding operation using a semi-automatic torch, the lever switch for starting the torch may be used as the PTP teaching switch.

Further, the switch is not necessarily required to be mounted on the welding torch. It may be located in a position in the vicinity of a welding gun (or a painting gun), which is easily accessible for the manual operation. Preferably, the switch is detachably mounted on the robot so that it may be removed upon completion of the teaching operation.

Needless to say, the production of the coded signals by a single switch is advantageous from the standpoint of simplicity of operation and cost. Thus, if desired, plural switches may be provided on the robot for producing the above-described coded signals.

Figure 36:
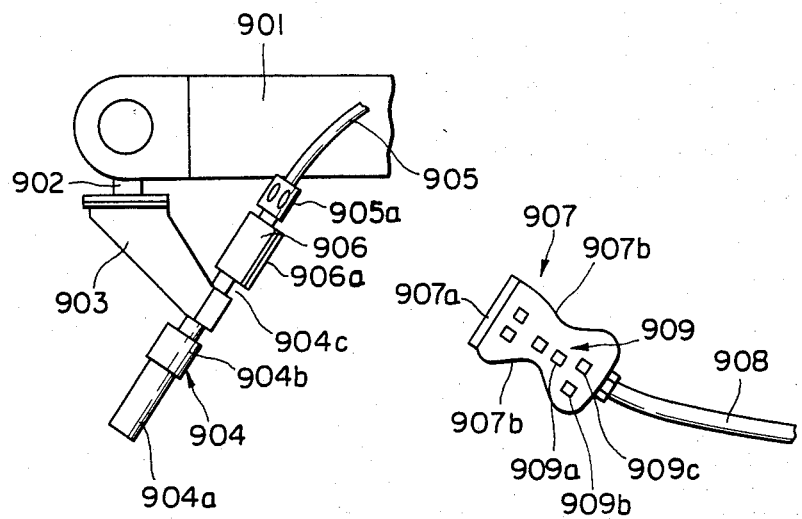
FIG. 36 is a schematic illustration of a teaching switch box according to the invention.

Shown in FIG. 36 is a further embodiment of the invention employing a teaching switch box which is detachably fixed on the welding torch and has a set of switches for giving the respective instruction signals in the direct PTP teaching operation. In FIGURE 36, indicated at 901 is a fore arm of a multi-articulate welding robot, at 902 a wrist portion which is pivotally and rotatably supported at the fore end of the wrist portion 902, at 903 a torch bracket fixed to a torch mounting portion at the distal end of the wrist portion 902 by screws or other suitable means, and at 904 a welding torch fixedly supported on the torch bracket 903 at a predetermined angle. The welding torch 904 is provided with, from its fore end, a shield gas nozzle 904a, a nozzle connecting screw 904a and a torch body proper 904c, and connected at its rear end to a conduit cable 905 through a box nut 905a. Indicated at 906 is a connecting member which is fixedly mounted on the torch body 904c of the welding torch 904 and provided with a coupling portion 906a for detachably connecting a switch box 907 to the welding torch 904.

The switch box 907 is formed in a suitable size with a curved grip portion 907b so that the operator can easily and snugly grip it in one hand during the teaching operation, and provided with a fitting portion 907a which is detachably engageable with the coupling portion 906a of the connecting member 906. A flexible control cable 908 is withdrawn from the rear end away from the coupling portion 907a of the switch box 907 to send to the robot or a control panel a variety of signals which are produced by depressing corresponding key switches 909 provided on one side of the switch box 907.

The switches 909 to be provided on the switch box 907 are preferred to include at least a position command switch 909a for instructing storage of positional data of a point, a welding start/end selector switch 909b for selecting a point of starting or ending the welding operation, and a linear/arcuate interpolation selector switch 909c for selecting linear or arcuate interpolation between particular instructed points. There may also be provided input key switches for setting the "welding voltage", "welding current", "welding speed" and the like for the sake of convenience and simplification of the teaching operation. If desired, a lamp or digital indicator may be provided in combination with these teaching key switches to display the currently selected mode of operation.

Of the above-mentioned key switches 909 which are to be manipulated in either the teaching operation, the switch 909b is preset in either the welding start or end position while the switch 909c is preset either in the position of the linear or arcuate interpolation before manipulating the point data read-in command switch 909a. In response to the data read-in signal from the switch 909a, the data A from the switch 909b, the data B from the switch 909c, and the positional data 1 to 5 which are fed from a converter 916 by conversion of the data of rotational angles $\theta_1 - \theta$ from the position detectors of the respective rotational shafts (five shafts in this case) of the robot elements are sequentially supplied to a data input circuit 917 and then stored in the memory device 918 as data relative to a given point. Of course, the data input circuit 917 need not be provided independently and may be arranged as part of the computer circuit (especially of CPU). In any case, a set of data are stored in the memory device in response to the data read-in command from the switch 909a.

Figure 38:
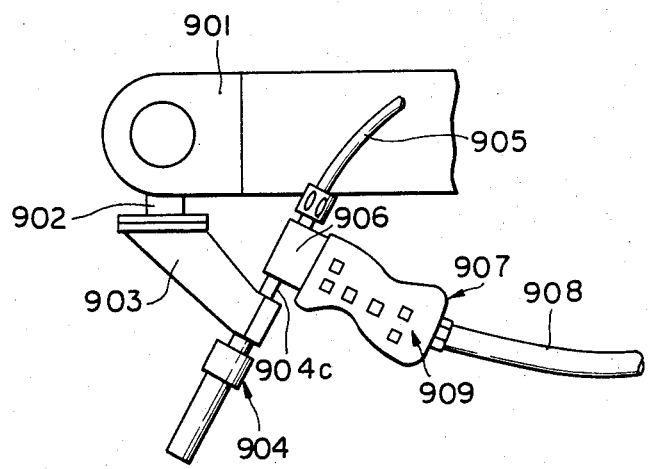
FIG. 38 is a schematic illustration showing the switch box as mounted on a welding torch.
Figure 39:
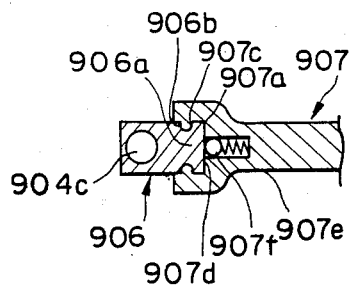
FIG. 39 is a schematic cross-sectional view showing a connecting member in engagement of a coupling portion of the switch box for fixing same to the welding torch.

The switch box 907 with the above-described arrangement and functions is removed from the welding torch during the playback operation as shown in FIG. 36. Prior to the teaching operation, it is fixed on the welding torch 904 by fittingly engaging the coupling portion 907a with the opposing coupling portion 906a of the connecting member 906 as shown in FIG. 38. In this particular embodiment, as seen in the sectional view of FIG. 39, the coupling portion 906a of the connecting member 906 is provided with longitudinal grooves 906b on the opposite sides, while the coupling portion 907a of the switch handle 907 is provided with protuberances 907c on the side walls of a coupling groove 907d. For fixing the switch handle 907 on the welding torch 904, the coupling groove 907d of the switch handle 907 is slidingly fitted onto the coupling portion 906a of the connecting member 906. The respective coupling portions 906a and 907a are forcibly held in this state by means of a pusher consisting of a steel ball 907f and a compression spring 907e since otherwise the switch box 907 would tend to move up and down in FIG. 39. In this connection, it is also effective to provide a recess or depression on the coupling portion 906a opposingly to the steel ball 907f.

Figure 37:
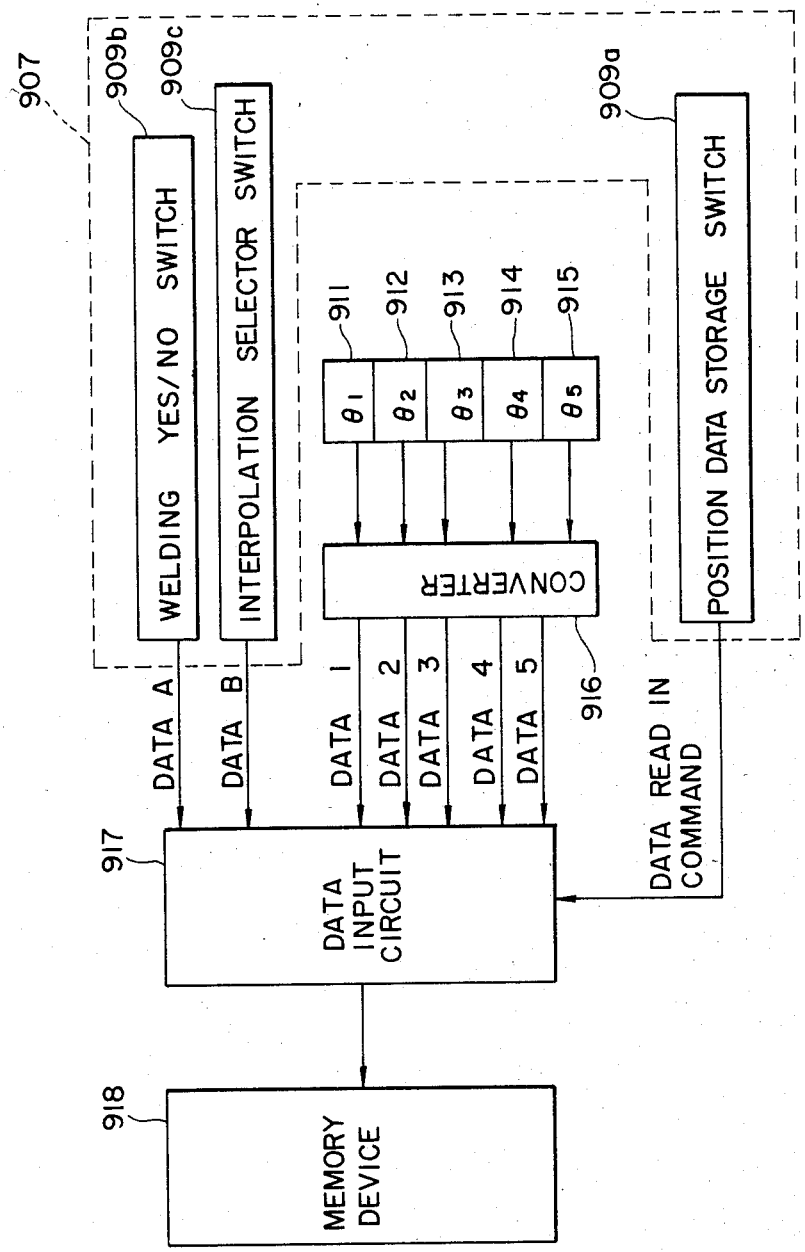
FIG. 37 is a block diagram explanatory of the functions of the switch box.
Figure 40:
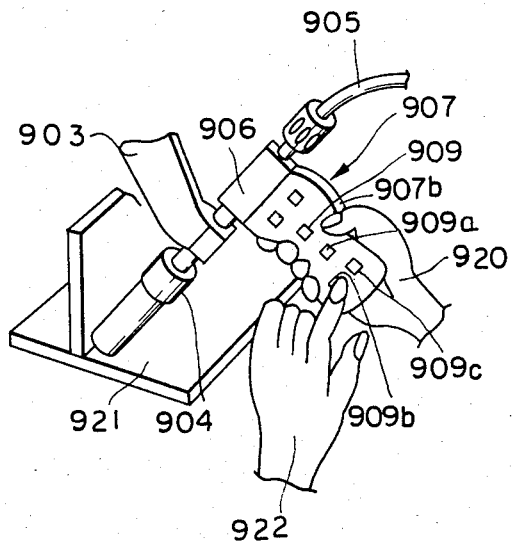
FIG. 40 is a schematic perspective view showing the manner of handling the switch box in direct PTP operation.

FIG. 40 shows more particularly the manner of handling the switch handle 907. The torch 904 is moved along a welding line of a work 921 by holding the grip portion 907b of the switch handle 907 normally in the right hand 920, while operating the key switches 909 by the left hand 922 as shown. At a teaching point, the data read-in switch 909a is turned on after setting the switch 909c is set, for example, in the position of linear interpolation and the switch 909b, for example, in the start position. As explained hereinbefore in connection with FIG. 37, the data A and B as well as data 1 to 5 are stored in the memory device in response to the data read-in command.

Although the switch box 907 is detachably fixed on the welding torch in the foregoing embodiment, it may be mounted on the torch bracket or in other position as long as it is easily accessible by manual operation.

Although the invention has been described in terms of specific illustrative examples, it is to be understood that other forms of the invention may be readily adopted within the scope of the invention as defined by the appended claims.

What is claimed as new and desired to be secured by Letters Patent of the United States is:

1. A control system for a direct teaching/playback robot, including a transmission having a low spring constant member connected to a drive source for driving a robot element through a frictional coupling means, and a drive source control means for controlling said drive source, said control system comprising:
   first position detecting means provided between said robot element and said frictional coupling means for detecting a rotational position of said robot element and for producing output data indicative of said rotational position of said robot element at an output terminal;
   second position detecting means connected to said drive source for detecting the rotational position of said drive source and for producing output data indicative of the rotational position of said drive source at an output terminal; and
   switch means for selectively connecting the output terminals of said first and second position detecting means to said drive source control means in teaching and playback modes of operation, respectively, such that delays or error caused by torsional deformation of the transmission are eliminated upon switching between said teaching and playback modes of operation.

2. A control system for a direct teaching/playback robot which is driven through a transmission having an input side coupled to a drive source and an output side coupled to a robot element, said transmission including a frictional coupling means for coupling said robot element to said drive source in a playback mode and for de-coupling said robot element from said drive source in a teaching mode, said control system comprising:
   first detecting means provided on the output side of said transmission for detecting a rotational position of said robot element and for producing output data indicative of the rotational position of the robot element;
   second detecting means provided on the input side of said transmission for detecting a rotational position of said drive source and for producing output data indicative of the rotational position of the drive means;
   a transfer means for transferring the output data of said first detecting means to said second detecting means;
   a switch means selectively connectable to said first and second detecting means; and
   a control means, including means for storing the output data of said first detecting means during operation in the teaching mode, for connecting said switch means to an output terminal of said first detecting means in the teaching mode to store the output data of said first detecting means, and, in the playback mode, for transferring the output data of said first detecting means to said second detecting means to initialize the latter and connecting said switch means to an output terminal of said second detecting means, and for feeding back to said drive source a signal based on the output data of said second detecting means and the output data of said first detecting means stored during the teaching mode of operation, such that delays or error caused by torsional deformation of the transmission are eliminated upon switching between said teaching and playback modes of operation.

3. A control system for a direct teaching/playback industrial robot having an arm or other robot element driven from a drive source through a transmission means including a reducer and frictional coupling means, said control system comprising:
   first position detecting means for detecting a position of said drive source and for producing output data indicative of the position of the drive source;
   second position detecting means for detecting a position of said robot element for producing output data indicative of the position of the robot element, said second position detecting means feeding back the output data indicative of the detected robot element position to an input terminal of said control system;
   a conversion means having applied thereto the output data from said first and second position detecting means for calculating differential data corresponding to a lag between the positions of said drive source and robot element on the basis of the output data received from said first and second position detecting means, and feeding back said differential data to an input terminal of said control system;
   a position data storage means for sequentially storing the data of instructed positions of said robot element fed from said second position detecting means in the teaching operation;
   a reset means for clearing at the outset of a playback operation the difference between the output data of said first and second position detecting means resulting from the teaching operation; and control means for synthesizing position data of said robot element from the sequentially stored output data of said second position detecting means and said differential data, and applying to said drive source a signal related to the difference between the synthesized value and the data of instructed position after multiplication by a predetermined gain.

4. A control system as set forth in claim 1, 2 or 3, wherein said robot element defines a gravitational moment, further comprising a balancing means for offsetting the gravitational moment of said robot element.

5. A control system as set forth in claims 1, 2 or 3, wherein said frictional coupling means is an electromagnetic clutch provided between a reducer and a robot element drive shaft.

6. A control system as set forth in claims 1, 2 or 3, wherein said reducer comprises a harmonic reducer inserted between an output shaft or a motor and a robot element drive shaft and provided with a rotatable circular spline, and said frictional coupling means comprises an electromagnetic brake engageable with an armature secured to said circular spline when actuated, for blocking rotation of said circular spline.

7. A control system as set forth in claim 5, wherein said robot element is driven from an electric motor through said electromagnetic clutch by operation of a software-controlled arithmetic processor, and a movement of said robot element is to be limited to a predetermined controllable range in direct teaching operation by a teaching movement limiting means comprising:
a clutch on-off circuit for controlling the on and off-state of said electromagnetic clutch; and
position check means adapted to receive the output data from said first position detecting means through said arithmetic processor to check if the received output data is in said predetermined controllable range, and to send a command signal to said clutch on-off circuit to actuate said electromagnetic clutch as soon as the received output data deviates from said predetermined controllable range.

8. A control system as set forth in claim 7, further comprising a counter means for sending a clutch-off signal to said clutch on-off circuit upon lapse of a predetermined time period after receipt of said clutch-on signal.

9. A control system as set forth in claims 1, 2 or 3, further comprising:
protection means for protecting said robot element, said protection means including a discriminator adapted to compare the output data of said first and second position detecting means and to produce a cut-off signal when the difference between said output data exceeds a predetermined value, and means for releasing said frictional coupling means in response to said cut-off signal.

10. A control system as set forth in claims 1, 2 or 3, further comprising:
protection means for protecting said transmission, including means for detecting a difference between the output data of said first and second position detecting means, and drive control means adapted to restrict or stop operation of said drive source when the difference between said output data exceeds a predetermined value.

11. A control system as set forth in claims 1, 2 or 3, further comprising:
means for calculating an amount of displacement of a distal end portion of said robot element in a direct teaching operation based on the output data of said first position detecting means, said calculating means reading in and storing the output data from said second position detecting means every time when said amount of displacement reaches a predetermined value in direct point-to-point teaching operation.

12. A control system as set forth in claim 11, wherein said robot element comprises a welding torch and a teaching stick attached to a fore end of a wire conduit of said welding torch during the direct teaching operation.

13. A control system as set forth in claims 1, 2 or 3, further comprising:
at least a switch mounted on or in the vicinity of a robot element to be gripped and manipulated by an operator in direct point-to-point teaching operation to produce more than two kinds of coded instruction signals by on-off operation of said switch, and
means for decoding said instruction signals to send corresponding command signals to the control system, said control system comprising a memory device for storing more than two kinds of data in response to said command signals.

14. A control system as set forth in claim 13, wherein said robot element comprises a wrist portion of a welding robot.

15. A control system as set forth in claim 13, wherein said switch is provided on a welding torch body.

16. A control system as set forth in claims 1, 2 or 3 wherein said robot is a welding robot having a welding torch supported on a wrist portion pivotally and rotatably connected to a fore end of a robot arm and adapted to play back a welding motion through a number of key points of a welding line by linear or arcuate interpolation, said control system further comprising:
a teaching switch box detachably mounted on said welding torch or on a structure in the vicinity of said welding torch and having a set of switches at least including a first switch for producing a signal commanding storage of the position data of said key point, a second switch for producing a signal specifying linear or arcuate interpolation, and a third switch for producing a signal indicative of a start or end point of said welding line, said switch box adapted to be manipulated while said welding torch is moved along a welding line in direct point-to-point teaching operation to produce the position data storage command as well as the data relative to the type of interpolation and welding or non-welding portions.

17. A control system as set forth in claim 16, wherein said welding torch comprises a connecting member having a coupling portion engageable with an opposing coupling portion provided on said teaching switch box for detachably mounting said switch box on said welding torch.

* * * * *